Aug. 21, 1951 L. C. FRAZIER 2,565,071
TIRE BUILDING MACHINE
Filed Oct. 28, 1949 14 Sheets-Sheet 1
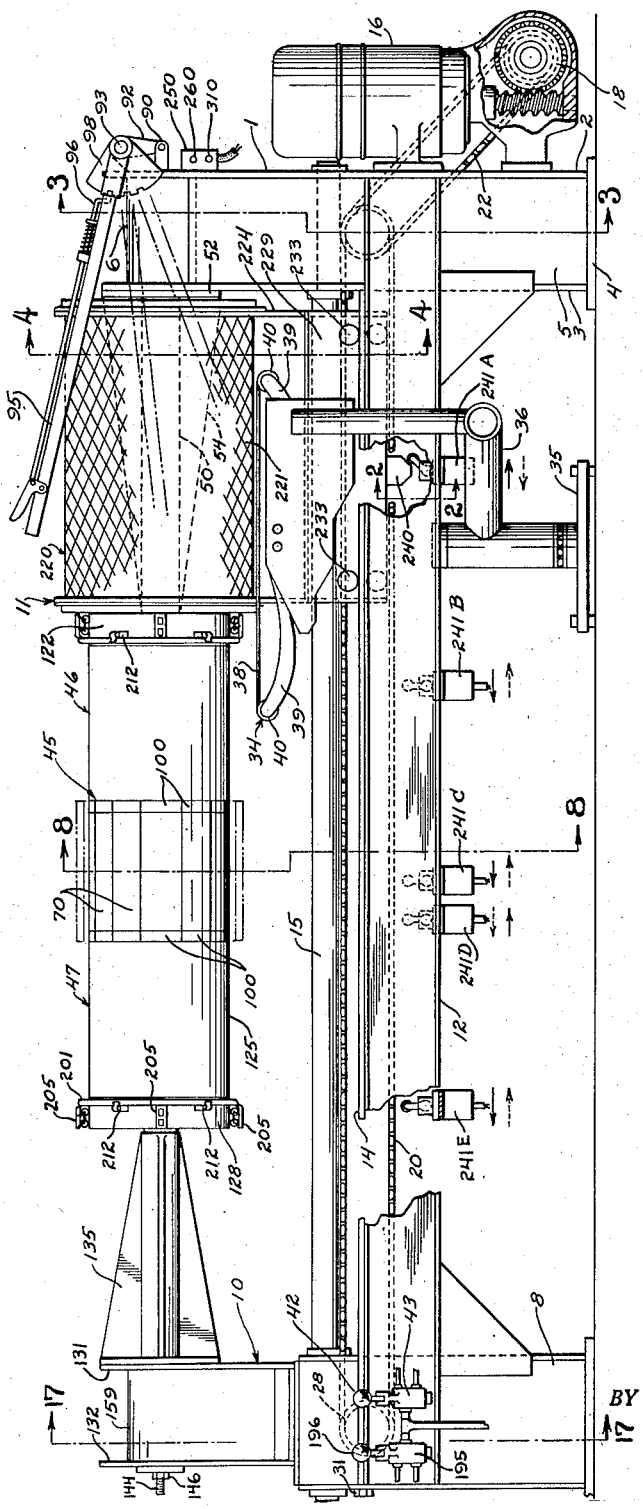
INVENTOR.
LARRY C. FRAZIER
BY
ATTORNEYS

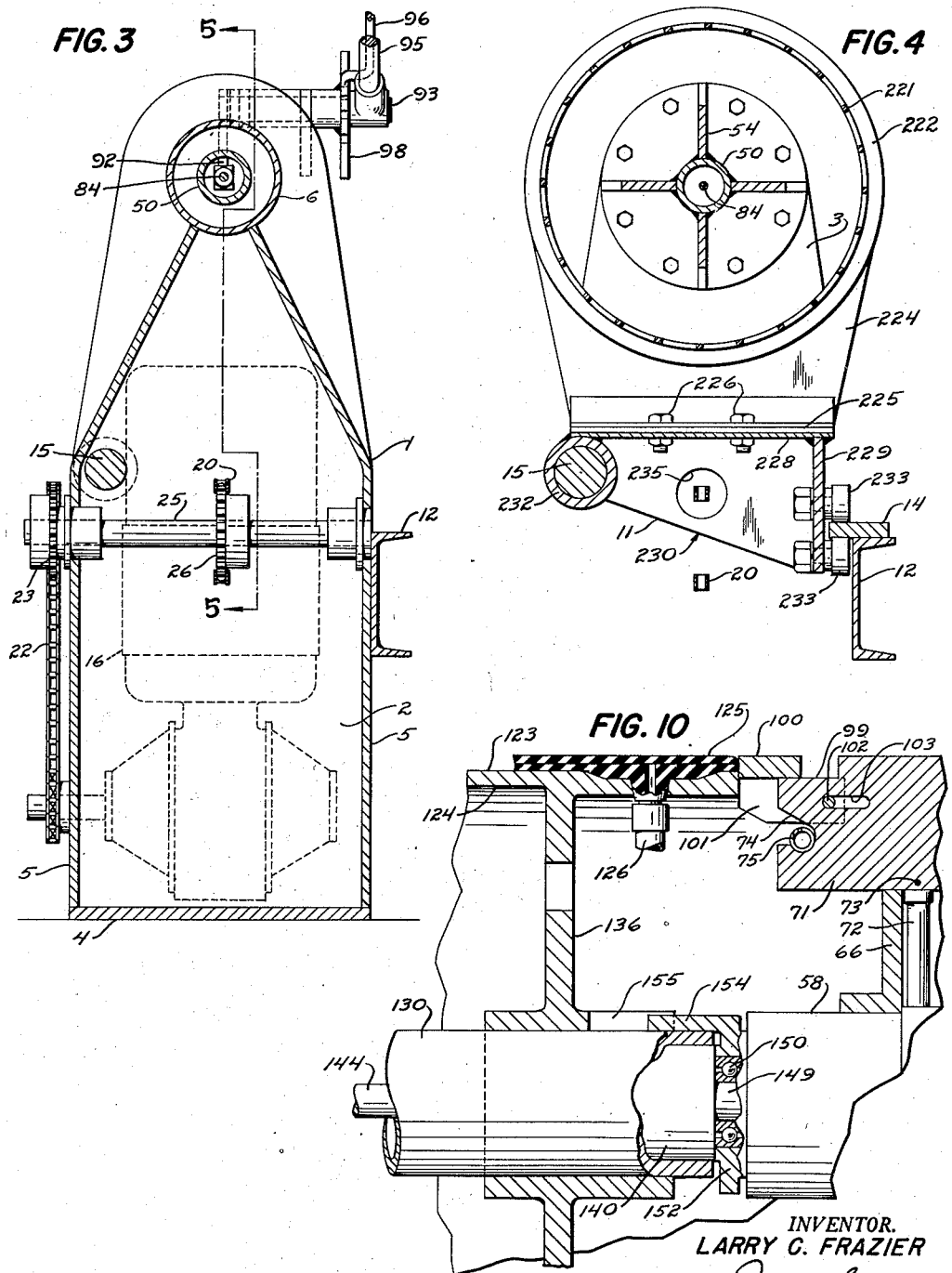

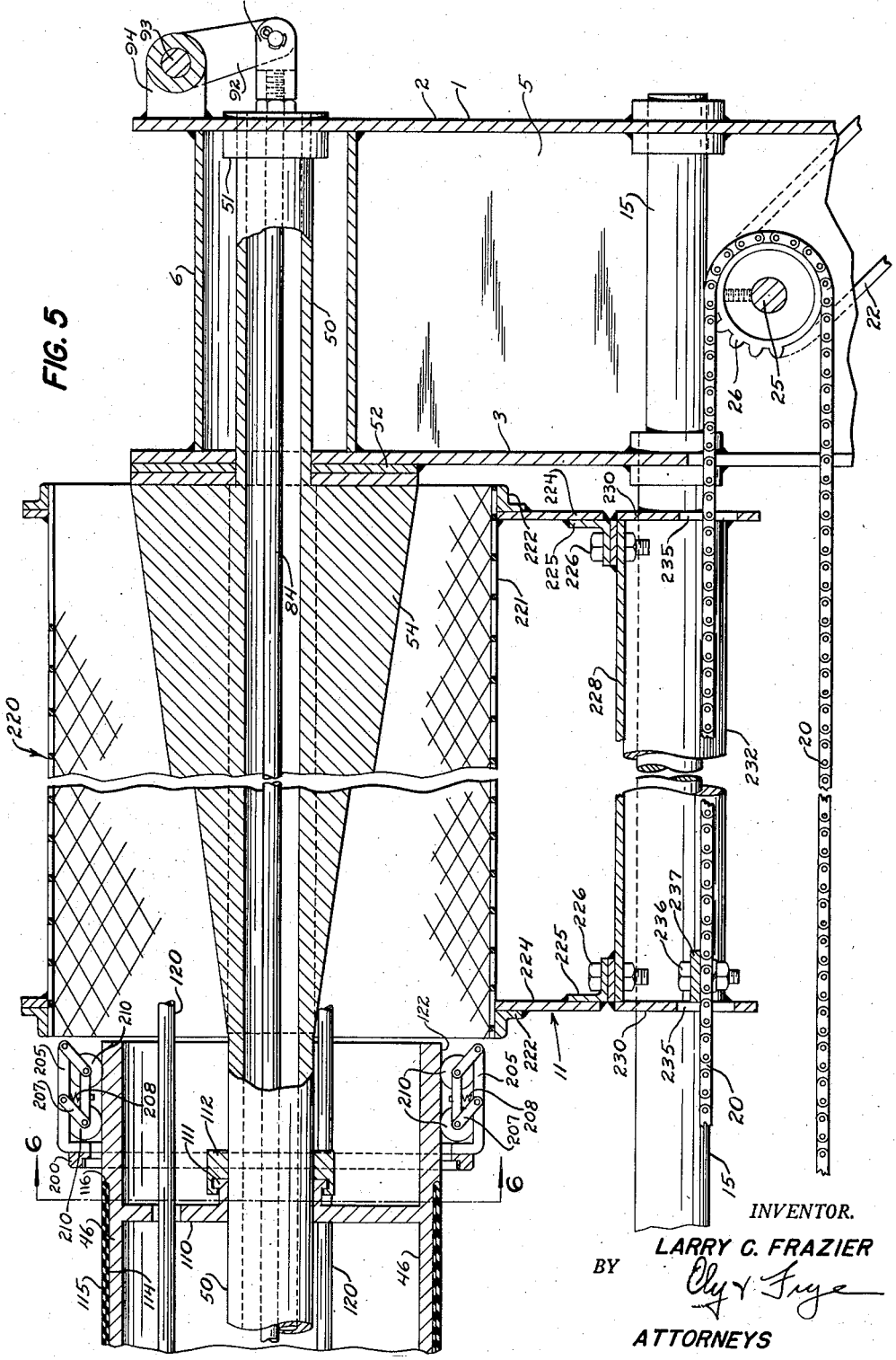

Aug. 21, 1951     L. C. FRAZIER     2,565,071
TIRE BUILDING MACHINE
Filed Oct. 28, 1949     14 Sheets—Sheet 4
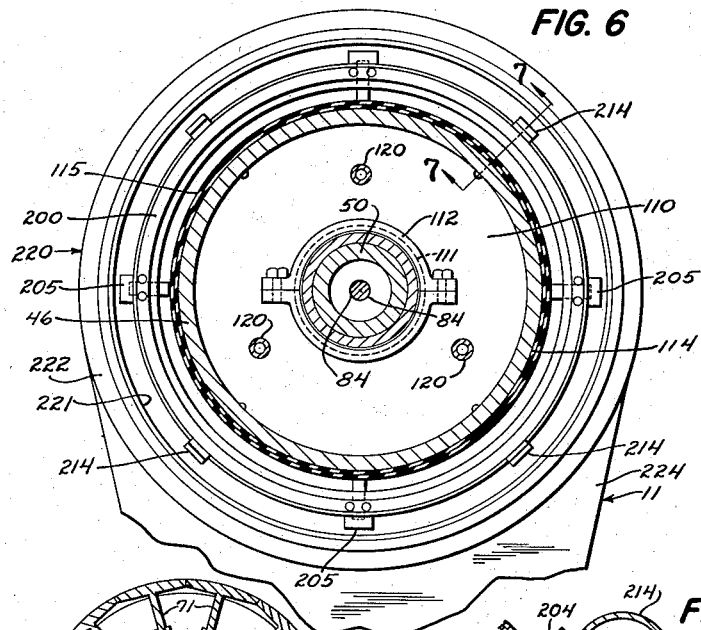
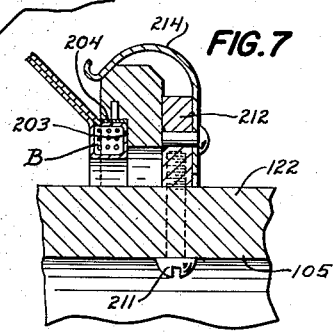
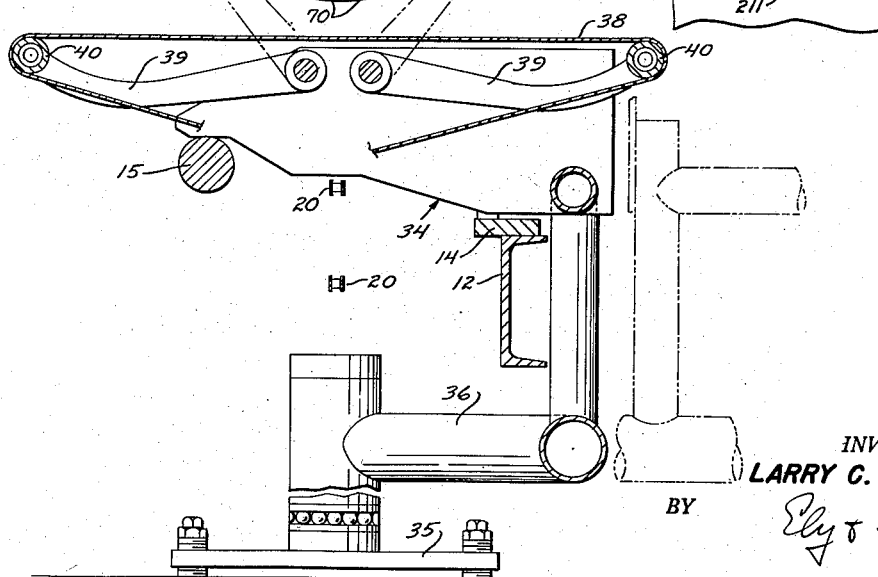
INVENTOR.
LARRY C. FRAZIER
BY
ATTORNEYS

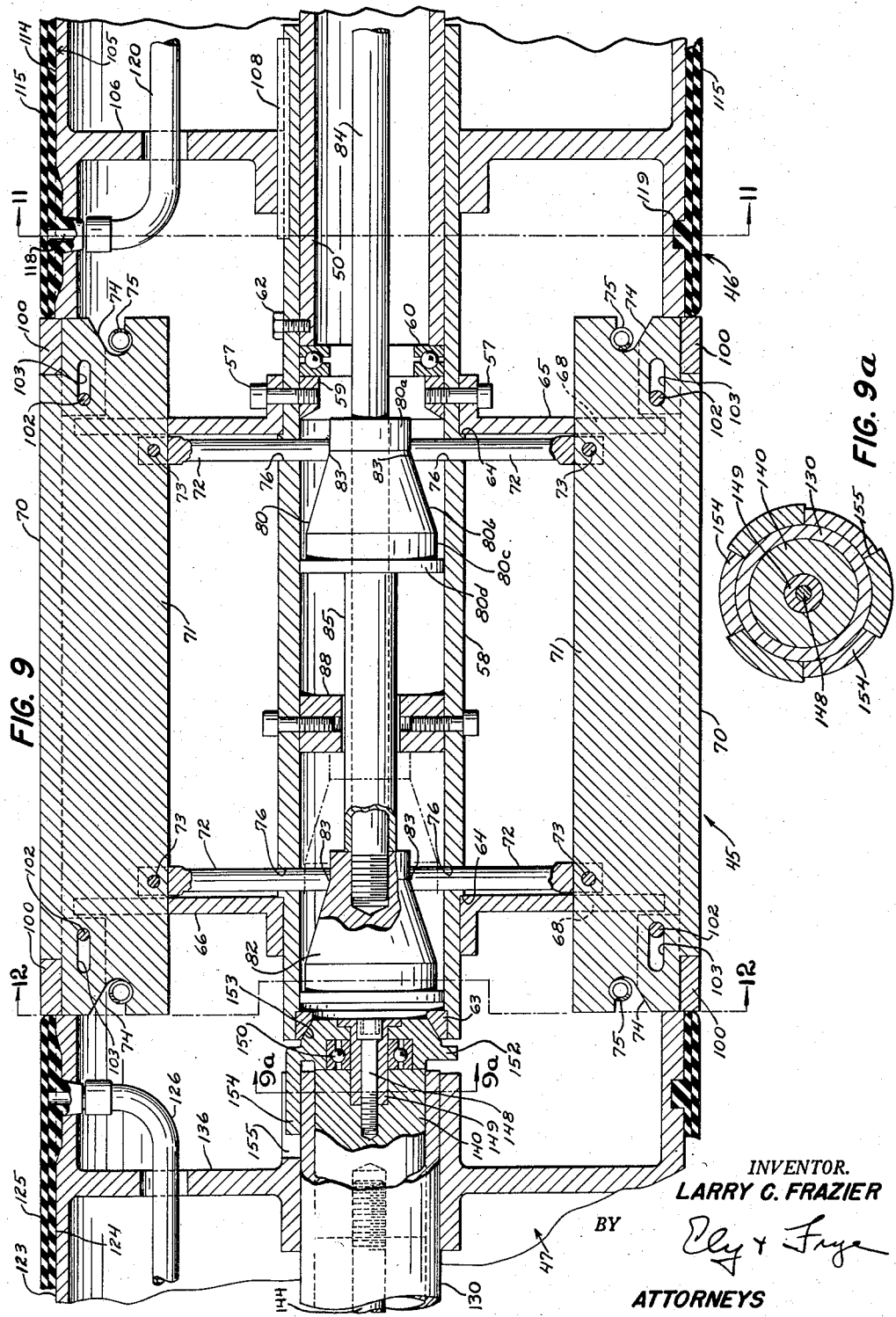

Aug. 21, 1951 L. C. FRAZIER 2,565,071
TIRE BUILDING MACHINE
Filed Oct. 28, 1949 14 Sheets-Sheet 6
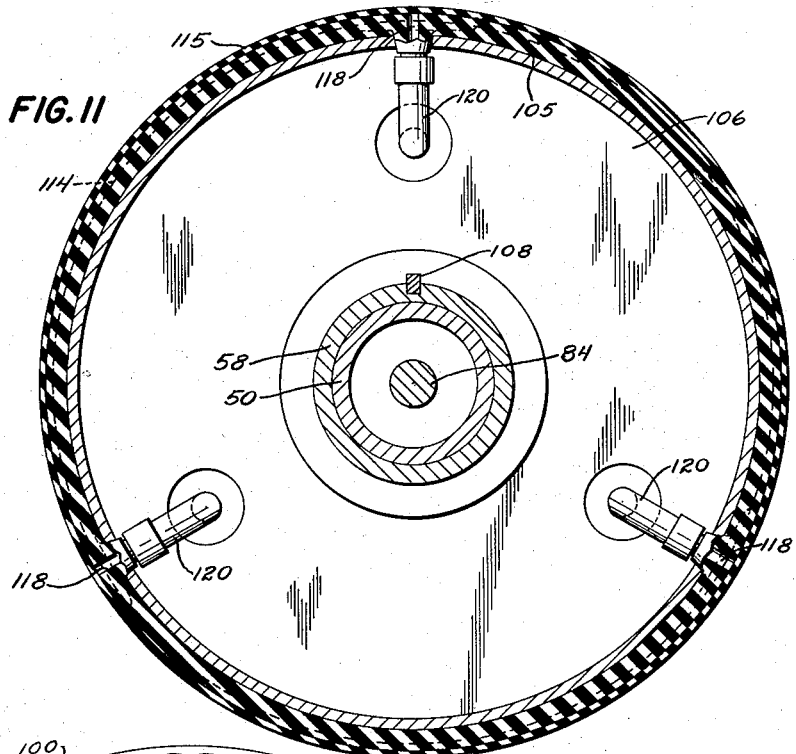
FIG. II
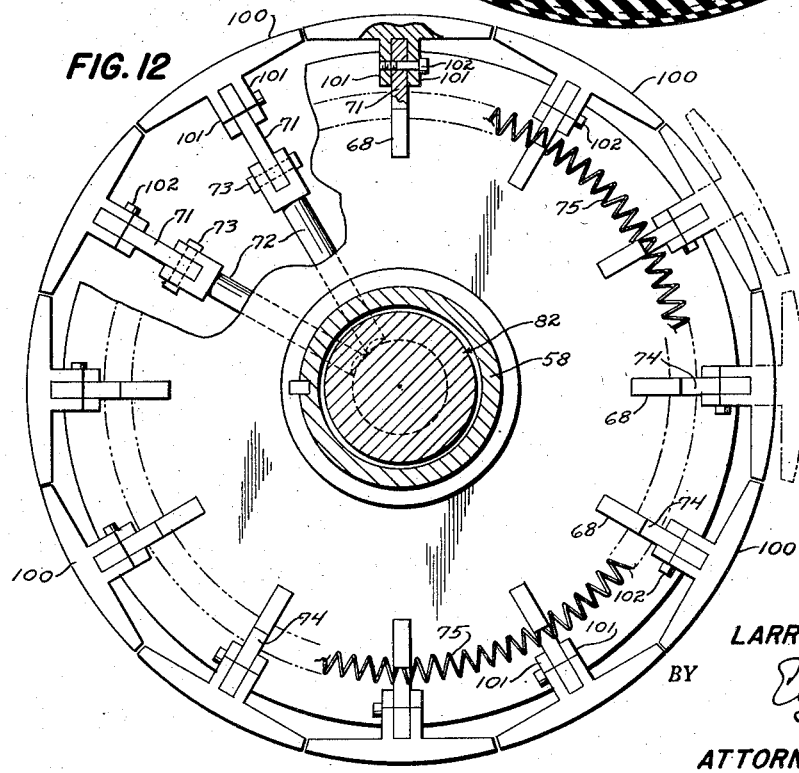
FIG. 12
INVENTOR.
LARRY C. FRAZIER
BY
ATTORNEYS

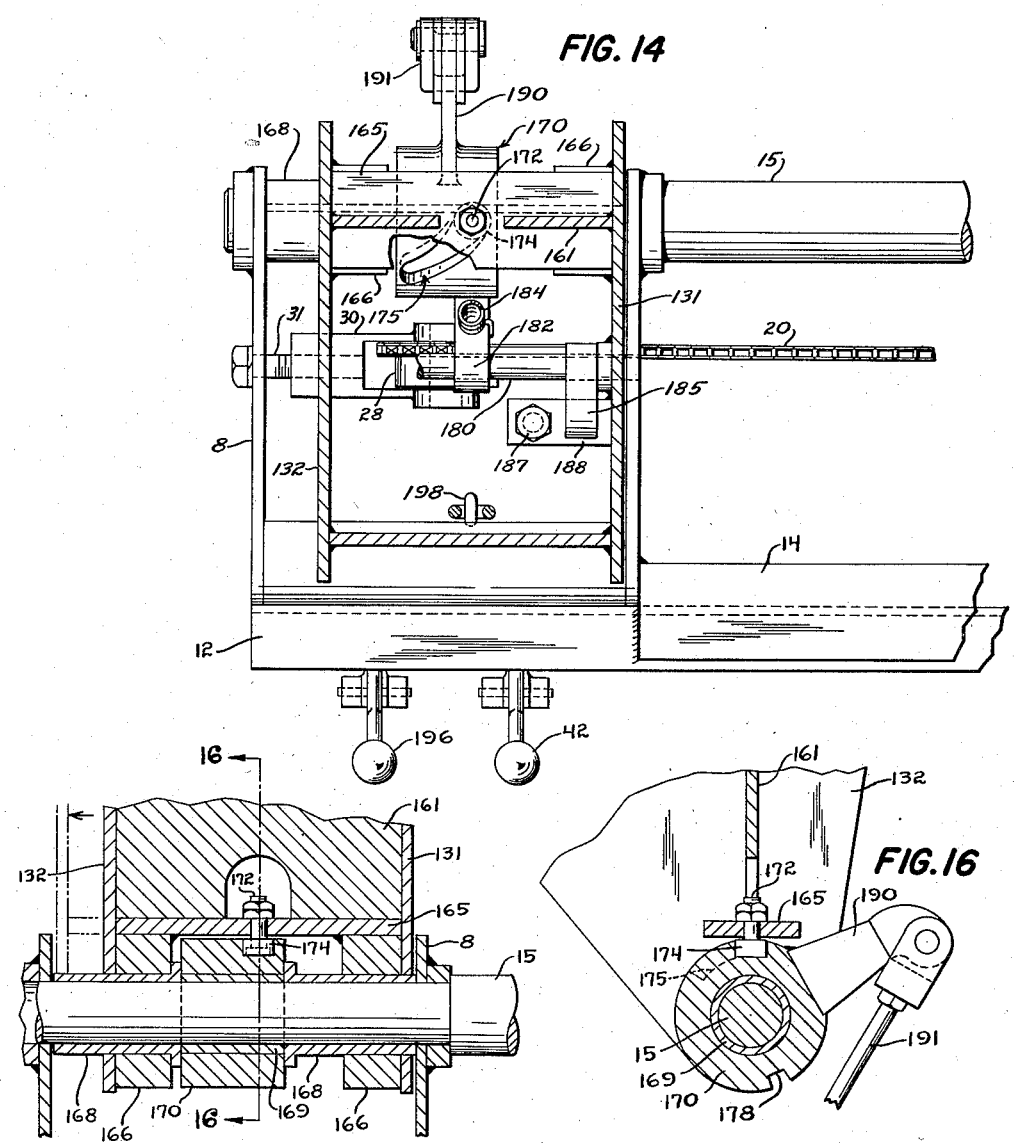

Aug. 21, 1951 L. C. FRAZIER 2,565,071
TIRE BUILDING MACHINE
Filed Oct. 28, 1949 14 Sheets-Sheet 9

INVENTOR.
LARRY C. FRAZIER
BY
ATTORNEYS

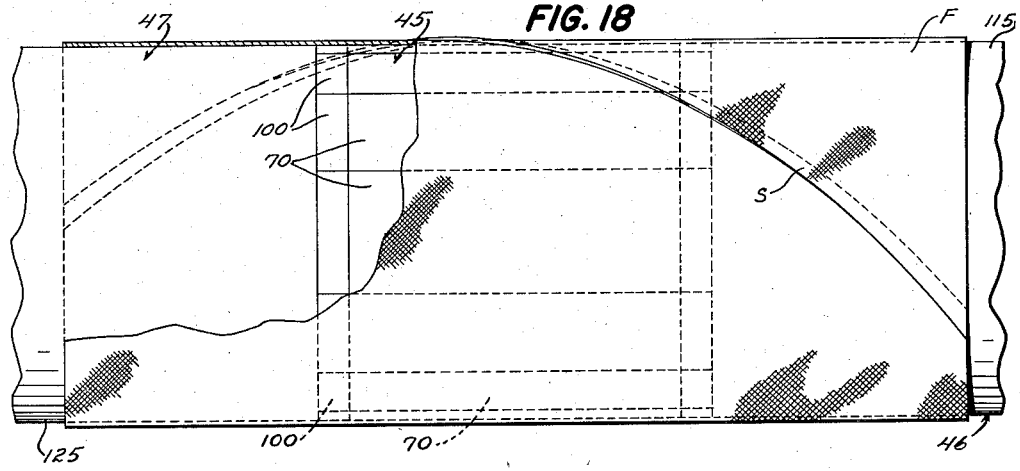
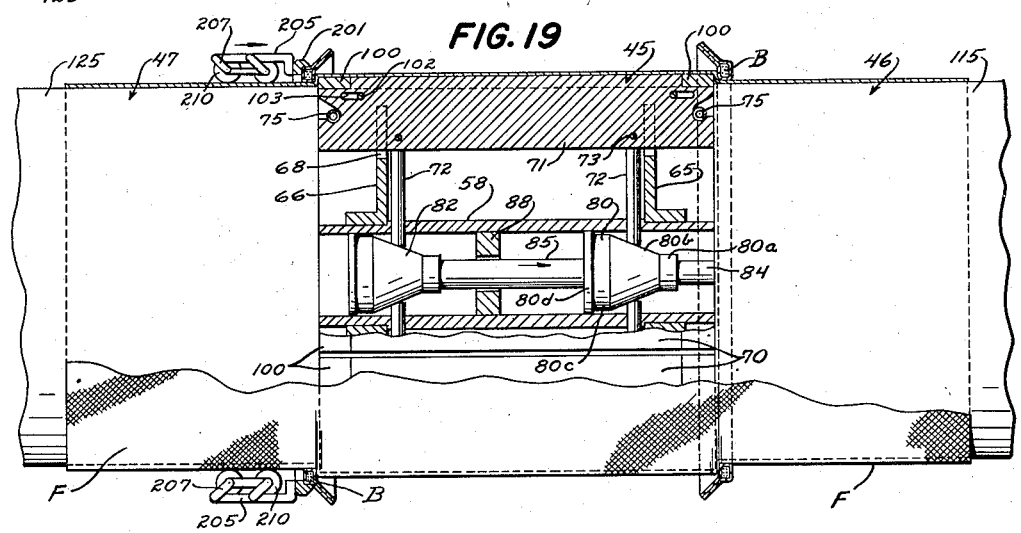
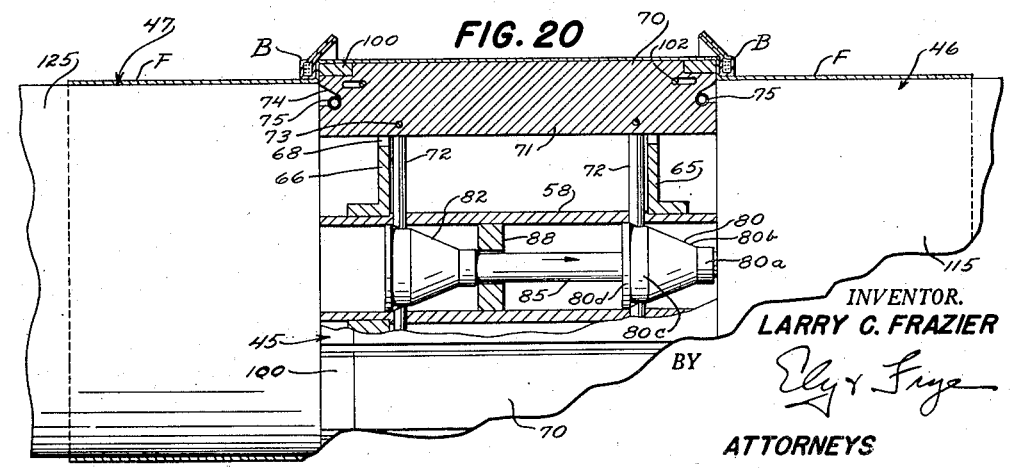

Aug. 21, 1951  L. C. FRAZIER  2,565,071
TIRE BUILDING MACHINE
Filed Oct. 28, 1949  14 Sheets-Sheet 11
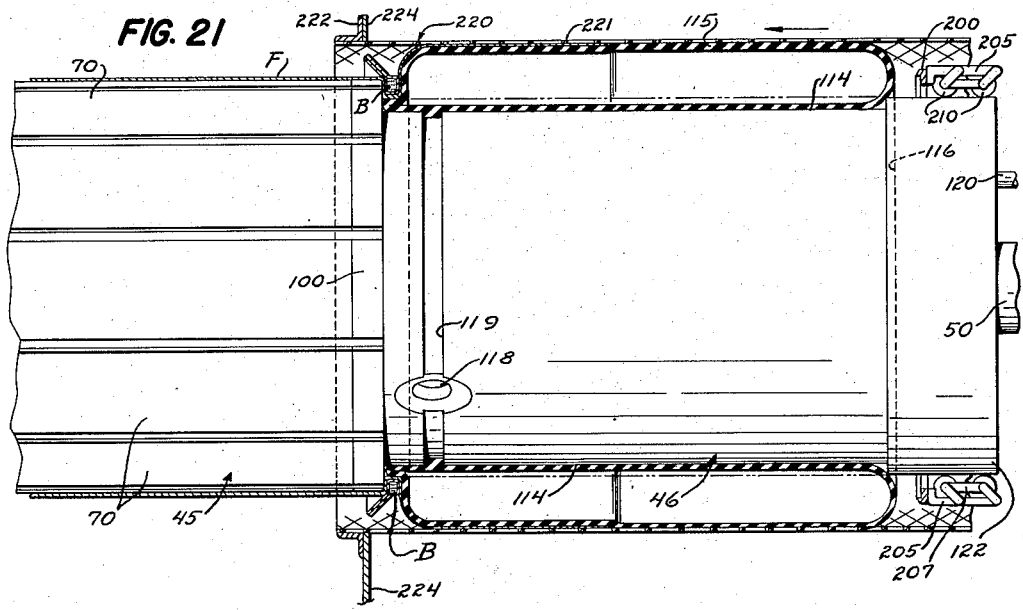
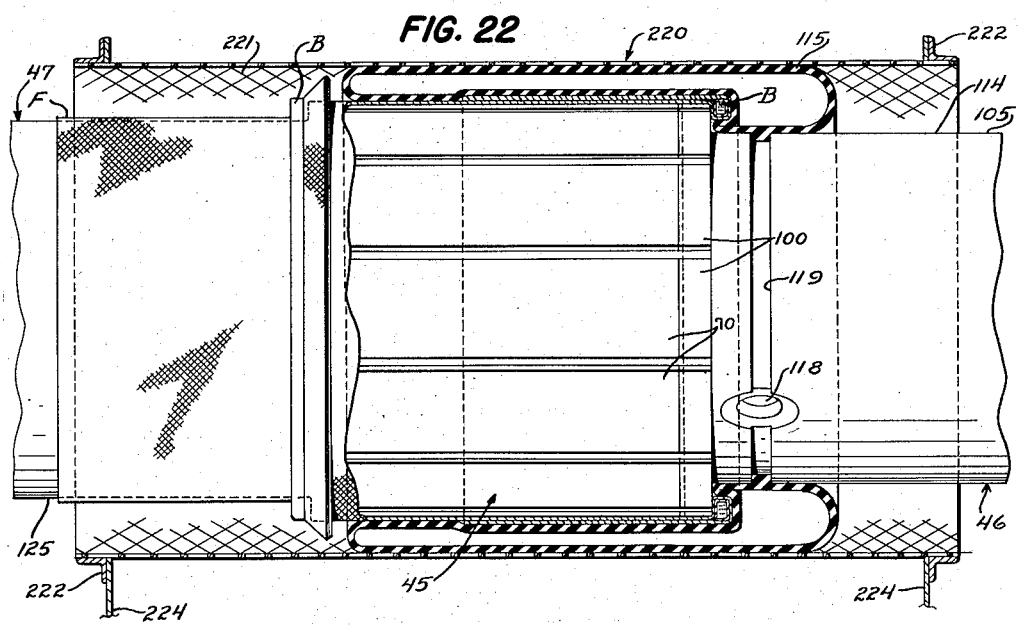
INVENTOR.
LARRY C. FRAZIER
BY
ATTORNEYS Aug. 21, 1951  L. C. FRAZIER  2,565,071
TIRE BUILDING MACHINE
Filed Oct. 28, 1949  14 Sheets-Sheet 12
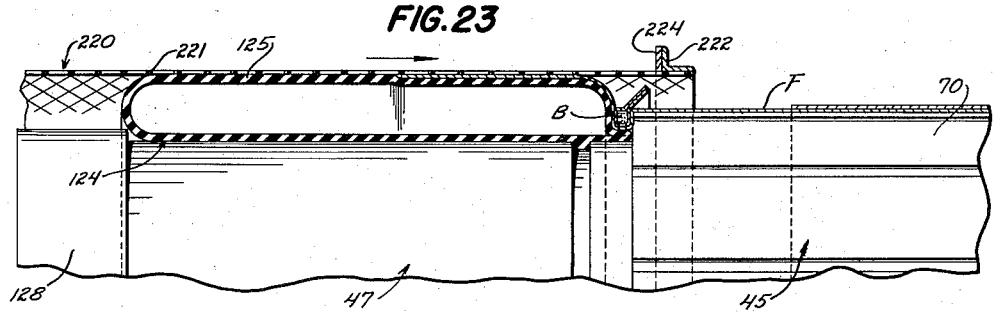
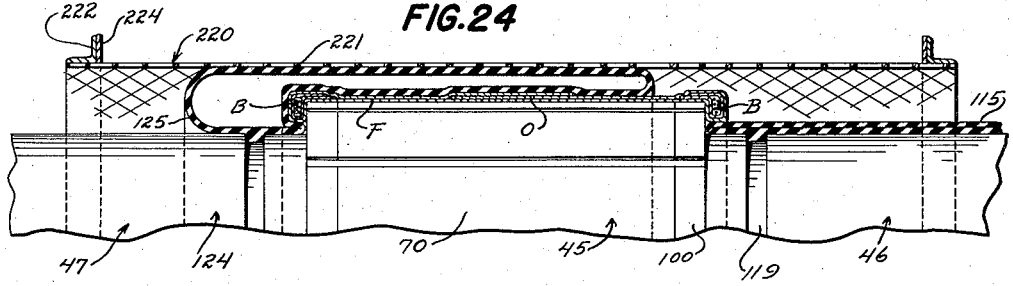
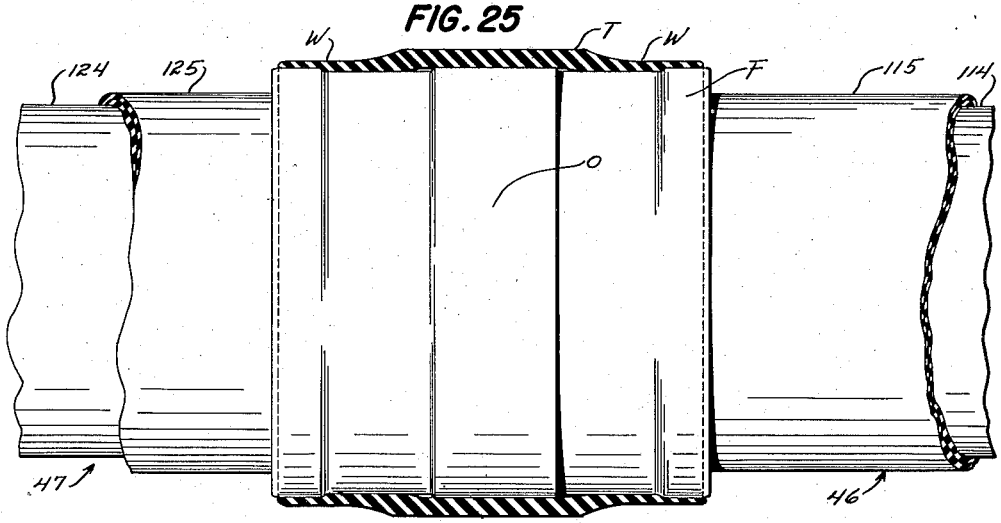
INVENTOR.
LARRY C. FRAZIER
BY
ATTORNEYS Aug. 21, 1951     L. C. FRAZIER     2,565,071
TIRE BUILDING MACHINE Filed Oct. 28, 1949     14 Sheets-Sheet 13

INVENTOR.
LARRY C. FRAZIER
BY
ATTORNEYS

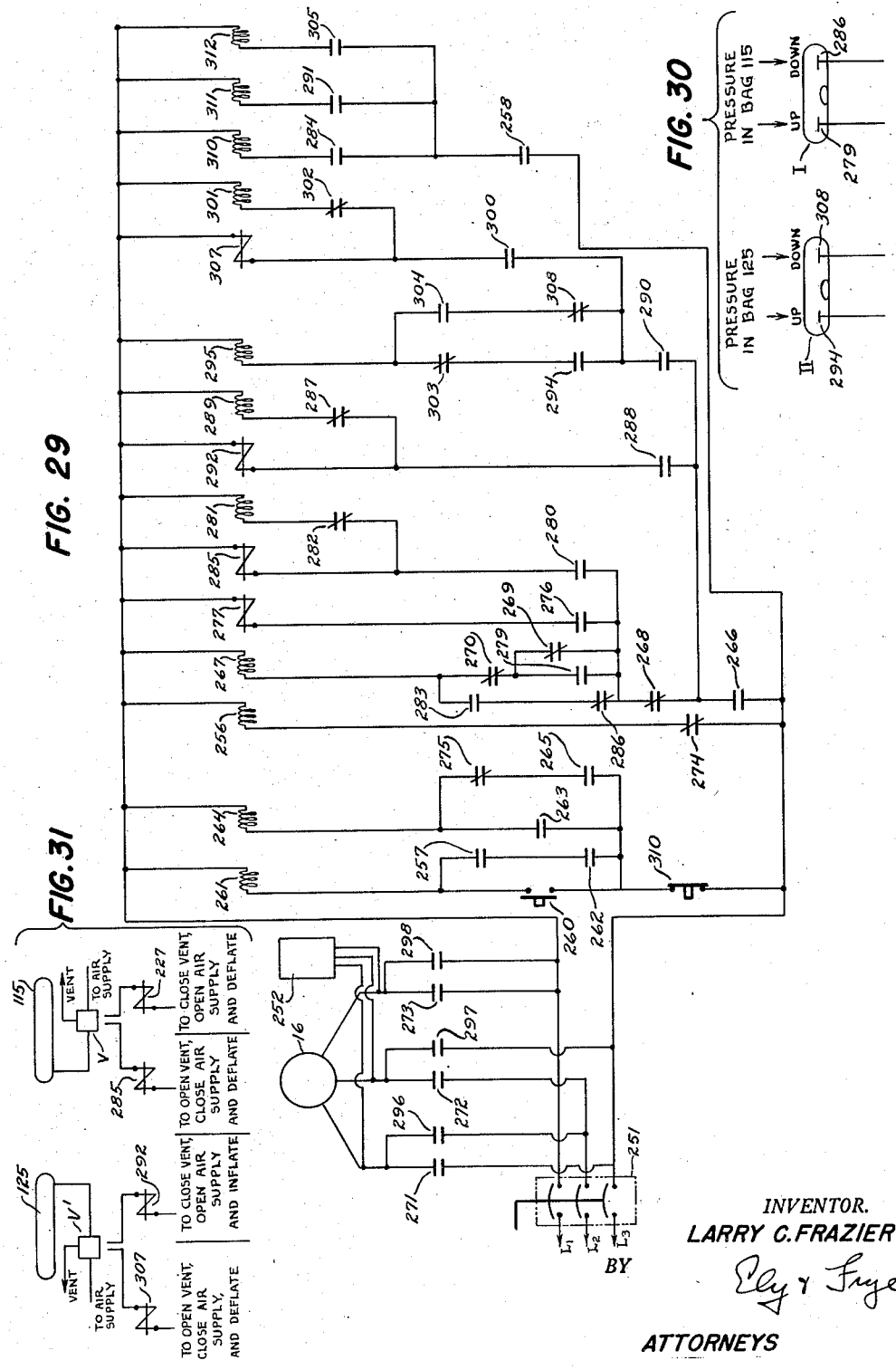

Patented Aug. 21, 1951

2,565,071

UNITED STATES PATENT OFFICE 2,565,071

TIRE BUILDING MACHINE

Larry C. Frazier, Niles, Mich., assignor to National-Standard Company, Niles, Mich., a corporation of Michigan Application October 28, 1949, Serial No. 124,225

34 Claims. (Cl. 154—9)

The present invention relates specifically to the art of tire building and the purpose is to devise a new and improved machine for building tires on flat or substantially flat drums. In many respects the procedure is similar to that shown in applicant's prior Patent No. 2,440,662 of April 27, 1948. The present invention has for its object the designing of a machine which will be substantially automatic in its operations so that, except for the application of the ply or plies of tire fabric to the drum and the application of the beads, the operation of building the tire carcass will be initiated by the pressing of a button and the machine will go through its various steps without any further hand operations until the carcass is completely formed.

Thereafter, if it be desired, the tread may be placed over the completed carcass and automatically pressed or "stitched" down to the carcass.

The objects of the invention are to improve upon the mechanism shown in my former patent so that a complete tire may be made with a minimum of labor, in much less time than is possible with previous tire building machines. The tire is well made and there are none of the fussy and time consuming hand operations which are characteristic of other forms of tire building machines.

GENERAL DESCRIPTION

The machine has a centrally located, expansible and collapsible main tire building drum on which the several operations of building the tire are performed. While the drum is stationary during the tire building operations, it may be rotated sufficiently so as to stagger the area at which the splice in the fabric occurs with the area of the splice in the tread. The drum may be flat or arched, as desired.

To permit the placement of the beads, to be described, and the removal of the finished tire, one side of the machine is provided with a shiftable tail stock and this tail stock preferably carries one of the auxiliary drums to be described later. Mechanism is provided to swing the tail-stock into and out of alignment with the main tire building drum and also to move it axially toward and away from the drum. The tire building drum and the other auxiliary drum are carried on a fixed stanchion on the other side of the machine.

The main drum is flanked by the two auxiliary drums, one of which may be carried by the tailstock. On the surfaces of the drum are located long, expansible, flat tubes or bags made of rubber or similar material. At the commencement of the operation the main or central drum is collapsed to its smallest diameter, at which time the outer surfaces of the bags, which lie flat on their respective drums, coincide with the outer surface of the central drum. In this position a ply of tire-building fabric is wrapped about the drum, the fabric being of sufficient width so that its two edges overlap the collapsed bags. The amount to which the plies extend over the bags is determined by the desired breadth that the edges of the plies will overlap at the tread portion of the carcass, as will be explained later.

The fabric employed is of any of the usual types employed in the building of tire carcasses and is usually a strip of bias-cut, rubberized cord tire fabric. When the ply is wrapped about the drum the ends of the ply will meet with a sufficient overlap to make a secure band and are "stitched" together.

For the application of the ply to the drum, any of the well known methods or machines may be employed, but it is preferred to use an applicator of a special type which is the joint invention of this applicant and Florian J. Shook, application for patent on which is Serial No. 128,186, filed November 18, 1949.

The applicator is shown in its relation to the tire building machine, but as it is the subject of the said copending application, it is not fully described, nor is it claimed herein.

After the ply is wrapped about the drum and spliced, the drum is partially expanded so that the edges thereof form shoulders against which the tire beads are placed. These beads are in the usual ring form, containing the wire reinforcement such as used in straight side tires, and are wrapped with the usual flipper strips. They are mounted in bead placing rings which are located at either side of the auxiliary drums beyond the inflatable bags. After the drum is given the preliminary or partial expansion, the bead rings are moved against the shoulders and the beads are adhered to the rubberized surface of the ply. The bead placing rings are then withdrawn. The beads are placed in the rings before the ply is applied to the drum and while the tail-stock is out of alignment with the drum, as has been described.

The main drum is then expanded to its outer limit, which draws the fabric tightly about the underside and inside of the beads. This operation is advisable to secure close adhesion of the fabric in the area of the beads. The expansion of the main drum is done by a hand lever at one side of the machine.

At one side of the machine, illustrated as the right hand side as the operator faces the machine, is a large hollow cylinder or cage which has a substantially greater inner diameter than the drum assembly. This cage telescopes over the drum, stopping at various points thereon, so that, in conjunction with the inflation and deflation of the bags and the movements of the cage, the fabric is folded over the beads from opposite sides overlapping at the center. In the operation of the perfected machine, which is shown and described herein, the movement of the cage is initated by pressing a button and the successive steps, together with the inflation and deflation of the bags, proceed entirely automatically.

In the sequence of steps the cage, starting from the right, moves over and in telescopic relation to the right hand auxiliary drum. The bag on that drum is now inflated, lifting the exposed side of the ply against the inner surface of the drum and holding it in contact therewith with considerable pressure which should be adequate to perform the subsequent operations. When the pressure in the bag has reached the desired point, inflation stops and the cage moves over the main tire building drum. This action serves to turn the bag progressively over the main or tire-building drum and this action will also turn the fabric and fold the edge of the fabric around the bead and, as the movement of the cage continues, the ply is pressed against the outer surface of the central area of the ply on the main tire building drum. The pull of the fabric as it progressively folds over the bead tightly wraps the fabric about the bead and presses it smoothly and with great force against the underlying portion of the fabric. The progressive movement removes all air which might be entrapped between the plies, thus eliminating air bubbles. This is a great improvement over older methods employed for "stitching" fabric plies and eliminates the operation of pricking the fabric to permit the escape of entrapped air or removing any wrinkles, which are incidents of older practices of tire building.

The cage stops when the first folding operation is completed and the pressure in the bag is automatically released. The tension in the bag, as soon as the pressure is released, causes the bag to fly back to its original position.

The cage now moves over the other or left hand auxiliary drum and stops. That bag is now inflated and the cage then returns to its position over the main drum, which folds that edge of the fabric around its bead and over the previously folded fabric. The pressure in the left hand bag is now released and it returns to its original position. The cage now returns to its original position at the extreme right of the machine and the carcass is completed.

While the described operations may be speeded up as much as may be practical, in normal operation and giving the machine ample time to perform all of its operations perfectly, the entire elapsed time from the moment that the cage leaves its original position to the time that it returns to that position, during which interval the carcass building operation is completed, is about 30 seconds. This is not only infinitely faster than any previously known tire building operation but, in addition, makes a better carcass.

If desired the carcass may be removed at this time by shifting the tail stock and collapsing the drum, whereupon the carcass is removed over the exposed side of the main drum.

However, the tread may be applied, preferably by using the applicator, and then "stitched" in place on the carcass. The operation is the same and performed in the same sequence, the only difference being that no fabric is present. The collapsible bags, as they move over the tread, exert a powerful pressure on the tread, removing any air pocketed between the tread and the carcass and pressing the tread firmly on to the carcass. The finished tire, with the tread, is then removed from the drum and is ready for the usual bagging and vulcanizing steps.

THE DRAWINGS

In the drawings and the accompanying description, the best known and preferred embodiment of the invention is shown. The machine illustrated and described has been demonstrated sufficiently to establish its complete practicability. While the machine and the steps thereby are described in sufficient detail so that the principles thereof and the operation may be understood, the invention may be modified, altered or improved without departing from the invention as it is set forth in the appended claims.

The movements of the cage are controlled by an electrical system which is in turn responsive at certain times to the pressures within the expansible bags. In the drawings will be found an abbreviated wiring diagram of the control system, but the devising of equivalent electrical or electro-mechanical systems to accomplish the objects of the invention is within the knowledge and skill of one versed in such matters.

In the drawings:

Fig. 1 is a front elevation of the complete machine taken from the position in which the operator stands. This view shows one position of an applicator which is convenient to the operator. In this view the central or main tire building drum is shown in full lines in its fully collapsed condition and the cage to the extreme right.

Fig. 2 is a section on the line 2—2 of Fig. 1 showing the control unit for arresting the carriage at its extreme right position.

Fig. 2a is an enlarged, front view of one of the several limit switches.

Fig. 3 is a section on the line 3—3 of Fig. 1.

Fig. 4 is a section through the cage and its carriage on the line 4—4 of Fig. 1.

Fig. 5 is a longitudinal section through the cage on the line 5—5 of Fig. 3.

Fig. 6 is a section on the line 6—6 of Fig. 5.

Fig. 7 is an enlarged section through a bead-setting ring on the line 7——7 of Fig. 6.

Fig. 8 is a vertical section on the line 8—8 of Fig. 1 showing the applicator in position to apply the ply on the drum.

Fig. 9 is an enlarged longitudinal section through the central or main tire building drum showing the drum in the condition where the ply is wrapped about it.

Fig. 9a is a section on the line 9a—9a of Fig. 9.

Fig. 10 is a detail showing the means by which the drum may be lengthened for tires of differing cross sections.

Fig. 11 is a section through one of the auxiliary drums on the line 11—11 of Fig. 9.

Fig. 12 is a section on the line 12—12 of Fig. 9.

Fig. 14 is a sectional view looking down at the tail-stock operating mechanism, the location of the view being shown by the section line 14—14 of Fig. 17.

Fig. 15 is a detail section on the line 15—15 of Fig. 17.

Fig. 16 is a section on the line 16—16 of Fig. 15.

Fig. 18 is a view showing the ply of fabric wrapped about the drum.

Fig. 19 is a view showing the operation of setting the beads.

Fig. 20 is a view showing the final expansion of the tire building drum.

Fig. 21 is a section showing the inflation of the tube or bag in readiness for the first folding operation.

Fig. 22 shows the cage moved to its second position, the first folding operation being completed.

Figs. 23 and 24 are the same as Figs. 21 and 22 but showing the second folding operation.

Fig. 25 is a view showing the tread in place.

Fig. 29 is a diagrammatic view of the wiring of an electrical system which may be employed to control the movements of the cage.

Fig. 30 is a view diagrammatically showing the switches, preferably mercury switches, which control the movement of the carriage when air pressure in bags is proper.

Fig. 31 is a view showing diagrammatically the control valves for the two pressure bags or tubes.

The tire which is made by this machine is composed of a fabric layer F. This may be a single ply or multiple ply of bias cut cord fabric or other tire building material, the cords in the individual plies in a multiple layer running in opposite diagonal directions. When the fabric ply is wrapped about the drum, the ends thereof will be spliced as at S, if a single ply is employed. If the ply is double the usual "fish tail" splice may be used. The two beads B are of the usual ring form and are composed of wire reinforcement embedded in a rubber matrix as is common practice. Around the beads are the customary flipper strips C.

When the ply or plies are folded about the drum, they will overlap to any extent desired, as shown at O, and thus reinforce the tire under the tread. This is a recognized tire design. If desired, the plies may overlap up to the bead lines on both sides thereof.

Figure 28:
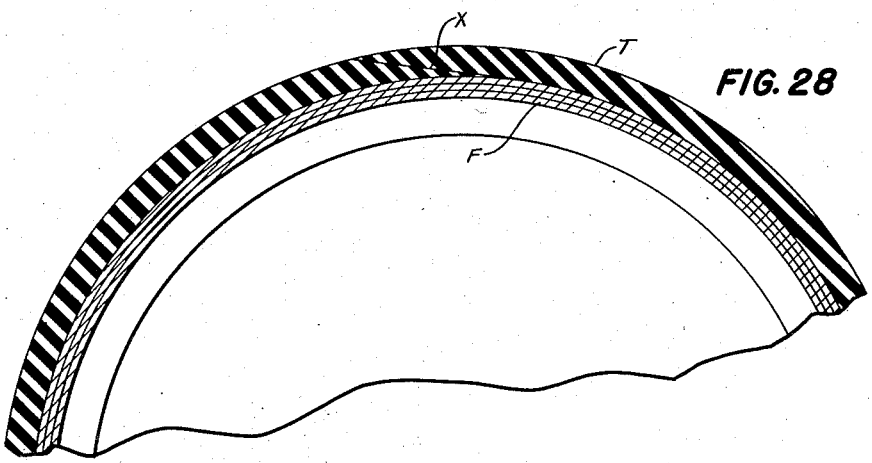
Fig. 28 is a section thereof on the line 28—28 of Fig. 27.

The tread T is in the usual form and may incorporate the breaker strip. The sidewalls W may be integral with the tread or they may be of a different stock joined to the edges of the tread. The ends of the tread strip are skived to make the overlap as shown at X in Fig. 28.

To overcome any objections of fabric splices coinciding, it is within the scope of this invention to provide for rotating the drum to a sufficient angular extent to avoid superposing splices. However, during the automatic fabric turnover and stitching operations the drum is stationary.

THE MACHINE FRAME

At one end of the machine, here shown at the right hand side thereof, is the stationary, vertical stanchion or pedestal 1, which is preferably composed of a rear, vertical plate 2 and a front plate 3 welded to a base 4. Side plates 5 complete the stanchion and in the upper part of the stanchion is the tubular housing 6 welded to the plates 1 and 2.

At the opposite end of the machine is located a shorter stanchion or pedestal 8, on the top of which is mounted the rocking and longitudinally movable tail-stock 10 which will be more fully described. Across the front of the machine and welded to the stanchions 1 and 8 is the heavy channel 12, to the upper surface of which is secured the long rail 14. The cage supporting carriage, indicated as a whole by the numeral 11, moves over the rail 14. This channel 12 also serves as a support for the stop switches which arrest the carriage at the various points in its travel, as will be described. Across the rear of the machine and supported in both stanchions is the horizontal shaft 15 which, in conjunction with the rail 14, forms the track or guideway for the carriage 11. This shaft also forms the pivot for the tail-stock 10.

On the stanchion 1 is mounted the reversible motor 16 with integral brake 252 (see Fig. 29) which, through the worm gear drive 18, actuates the chain 20 to the upper run of which the carriage 11 is attached. The motor drives the chain 20 to and fro through a shorter chain 22 which passes around a sprocket 23 on a countershaft 25 mounted in the stanchion 1. On the shaft is also a sprocket 26 over which the chain 20 travels, the other side of the chain being carried on a sprocket 28 mounted in a clevis 30 located in the rear wall of the stanchion 8 and adjustable by the bolt 31 to take up any slack in the chain.

The applicator to which reference has been made is indicated as a whole by the numeral 34. It is mounted on a pedestal 35, preferably located near the right hand end of the machine. It is supported on an angular swinging arm 36 so that when out of use it is moved to the position shown in Fig. 1. When in use it is located beneath the central part of the tire building drum, as shown in Fig. 8, and between the drum and the chain 20. In this position it may rest upon the shaft 15. The upper surface of the applicator is composed of a belt 38, the ends of which are anchored to the main frame of the applicator. On the applicator are two swinging arms 39, the outer ends of which carry rollers 40, which, when the arms are lowered, hold the top surface of the belt in a horizontal plane.

When the arms 39 are raised to the dotted line position shown in Fig. 8, the fabric or the tread, as the case may be, is wrapped about the drum, sufficient space being provided between the rollers 40 when the arms are raised to permit the necessary splices to be made.

The operator will place the ply or tread, cut to the proper length, on the belt 38 when the applicator is in the position shown in Fig. 1 and, when the ply or tread is to be applied, he swings the applicator to the position shown in Fig. 8. He then moves the control lever 42, opening a valve 43, which through piped connections raises the arms. The connections and mechanism for actuating the applicator are not shown as the applicator is another invention and is shown only for the purpose of completing the description necessary to an understanding of the present invention. The ply or tread having been spliced, the valve 43 is reversed, the arms 39 are lowered, and the applicator is returned to the position shown in Fig. 1. In building a two-ply tire, the operator has a sufficient time interval while the machine is operating to lay the stock on the belt 39 for the succeeding operations.

THE TIRE BUILDING DRUM

The tire building drum is made of three sections in alignment across the machine and between the stanchions. The central section is the main tire building section for on it the operations of combining the various elements of the tire are performed. It is flanked on the right, as shown herein, by the stationary auxiliary drum and on the left by the shiftable auxiliary drum. The main drum is indicated as a whole by the numeral 45, the stationary auxiliary drum by the numeral 46, and the shiftable auxiliary drum by the numeral 47.

(a) The central drum

The outer periphery of this drum is made of a plurality of arc-shaped sections or shoes which are movable toward and from the axis of the drum to vary the circumference thereof. Through the walls 2 and 3 of the stanchion 1 at the housing 6 is passed a long, heavy, hollow shaft or sleeve 50 mounted at its outer end in a bearing 51 in the wall 2. At the wall 3 it passes through a reinforcing plate 52 to which is welded and bolted a long, conical, reinforcing spider 54 which extends to the right hand side of the drum 46. This spider is of sufficient length and rigidity to support the load on the outer end of the sleeve 50 and over this spider the cage is received when in its idle position. The sleeve 50 extends to a point near the right hand side of the main drum 45. Over the end of the sleeve 50 is an outer sleeve 58 which extends beyond the sleeve 50 and constitutes the core or central shaft of the main drum. A collar 59 is secured to the interior of the sleeve 58 at a midway point by bolts 57 and between the collar and end of the sleeve 50 is a ball bearing cage 60 which facilitates the rotation of the drum for the reasons stated. A set screw 62 may be inserted as shown to hold the sleeves 50 and 58 from rotation if desired. In the extreme inner end of the sleeve 58 is set a ring 63, the outer surface of which is conically recessed to serve as a register for the auxiliary drum 47.

The central portion of sleeve 58 is enlarged to provide oppositely facing shoulders 64. Against the right hand shoulder is placed a disk or plate 65, the inner edge of which is flanged and held in position by the bolts 57. A second plate 66 is set against the left hand shoulder 64 and may be welded in place thereon.

From the outer edges of the plates 65 and 66 extend a plurality of radial slots 68 equal to the number of shoes or sections 70 which constitute the outer working surface of the drum. The outer surfaces of the shoes are shown as parallel to the axis of the drum but they may be tapered at the ends to accommodate additional thicknesses of bead flipper and chafer strips. The outer surface of each shoe is circumferentially arc-shaped and along the inner surface is a rib 71 which extends the length of the central drum and is received in registering slots 68 in the end plates. Each rib 71 is set in a fork on the outer end of a radial pin 72 and secured by transverse bolts 73. The shoes are simultaneously moved inwardly or outwardly by the pins 72 to vary the effective circumference of the drum. In each end of a rib 71 there is cut a pocket or socket 74 and in each series of pockets, on either end of the drum, is received a contractible spring ring, shown herein as an endless coil spring 75 which serves to draw the several shoes 70 inwardly.

Each pin 72 passes through a guide opening 76 in the central hollow shaft 58. The pins 72 of the right hand set are held by the spring 75 against an expanding cone 80 located within the hollow shaft. Each cone is formed with a reduced flat surface 80a, an intermediate coned surface 80b, a high flat surface 80c and a stop flange 80d, the latter also serving to guide the inner end of an operating rod 84. The pins of the left hand set are likewise held against a second expanding cone 82. The end of each pin is formed with a partially beveled and partially flat surface 83 to facilitate movement over the cones and as a register on flat surfaces thereof.

Extending through the sleeves 50 and 58 and out beyond the stanchion 1 is the long rod 84. On the inner end of this rod are fixed the cones 80 and 82 spaced apart by a sleeve 85. A stop collar 88 is fixed at a midway point on the interior of the sleeve 58 to arrest the movement of the rod in either direction as the cones move the drum from fully collapsed to fully expanded position.

The outer or extreme right hand end of the rod 84 is fastened to a clevis 90 which is pivotally connected to a crank 92 mounted on a shaft 93, rotatable in brackets 94 secured to the outer surface of the stanchion 1. To the shaft 93 is attached the hand lever 95 having a detent 96 which will engage notches cut in a sector plate 98 mounted on the stanchion 1. By the movement of the lever 95 the operator may move the several shoes 70 to vary the circumference of the drum through the operation of the cones 80 and 82. In Figs. 1, 9, and 18 the drum is shown in its fully collapsed position to receive the fabric ply. In Fig. 19 the lever 95 has been moved to its midway position with the drum partially expanded for the bead setting operation. In Fig. 20 the lever 95 has been moved to its lowermost position and the drum is fully expanded.

In the majority of the views the machine is shown as set for making a tire of the minimum cross-section for a given bead diameter. To adapt the machine for making larger cross-sections of tires with the same bead diameter, the drum must be widened and such a setting is shown in Fig. 10.

The ends of each shoe are cut away to provide rabbeted seats 99 in which are located short supplemental shoes 100 (see Fig. 12). The underside of these supplemental shoes are formed with parallel wings 101 which embrace the rib 71. Set screws 102 are passed through the wings 101 and through the slots 103 in the ribs to hold the supplemental shoes 100 in their adjusted positions.

(b) The fixed auxiliary drum

The auxiliary drum 46 is a cylinder 105 having a radial supporting web 106 near the central drum which is slidable on the sleeve 58 and splined thereto as at 108. The other side of the drum is provided with a web 110 slidably fitted over the sleeve 50. At the aperture for the sleeve 50 the web 110 is formed with an outwardly extending flange, as at 111, which is received in a split collar 112 which is clamped about the sleeve 50. The arrangement which has just been described fixes the drum 46 in its adjusted position toward and away from the adjacent side of the main drum to permit the widthwise adjustment of the main drum.

From the inner edge which is adjacent the central or main drum to a point a short distance from its other end, the face of the cylinder 105 is cut away to provide a recess or seat 114 to receive the inflatable bag 115, the wall at the right hand side of this seat being undercut as at 116 to receive the edge of the bag. The seat 114 is of sufficient depth so that when the bag is deflated, as shown for example in Fig. 9, the outer surface thereof coincides with the periphery of the central tire building drum.

At points near the central drum the bag is formed with inlets 118, shown as three in number, to which are connected the flexible conduits 120 by which air is admitted to and exhausted from the bag. These conduits extend outwardly through holes in the webs 106 and 110 and outwardly beyond the stanchion 1 where they are connected to any suitable valve mechanism (indicated at V in Fig. 31), through which air is exhausted or from which they receive air under pressure from a source which will supply the requisite pressure. The valves are controlled by the electrical connections which will be described. The inlets 118 serve to anchor the bag to the cylinder 105, the surface of the cylinder being channeled as at 119 to receive the thickened portion of the bag at the several inlets.

The raised portion of the cylinder at the rear of the bag, indicated at 122, serves as a rest for the right bead placing ring when it is in idle position.

(c) The shiftable auxiliary drum

The drum 47 is in some respects similar to the drum 46. It has a similar cylinder 123 with a recessed outer face 124 to receive a similar inflatable bag 125 connected to pressure lines 126. It also has the ledge 128 serving as a rest for the left hand bead placing ring.

The drum assembly 47 is carried by the hollow shaft 130 which extends through the inner and outer walls 131 and 132 of the pivoted tail-stock 10. At the point where the shaft 130 passes through the wall 131 there is welded the reinforcing plate 134 to which is secured the conical reinforcing spider 135 similar to the spider 54.

The cylinder 123 is held on the shaft 130 by the webs 136 and 137, the latter being located on the shaft by the split collar 139. The webs 136 and 137 may rotate about the shaft 130 for the reasons stated. It will be noted that the drum 47 is not adjustable along the shaft 130, the variations in the width of the building drum being compensated by an adjustable stop which arrests the inward movement of the drum 47 when the inner edge of the drum makes contact with the edge of the central drum, in whatever position the shoes 100 may be placed.

Figure 13:
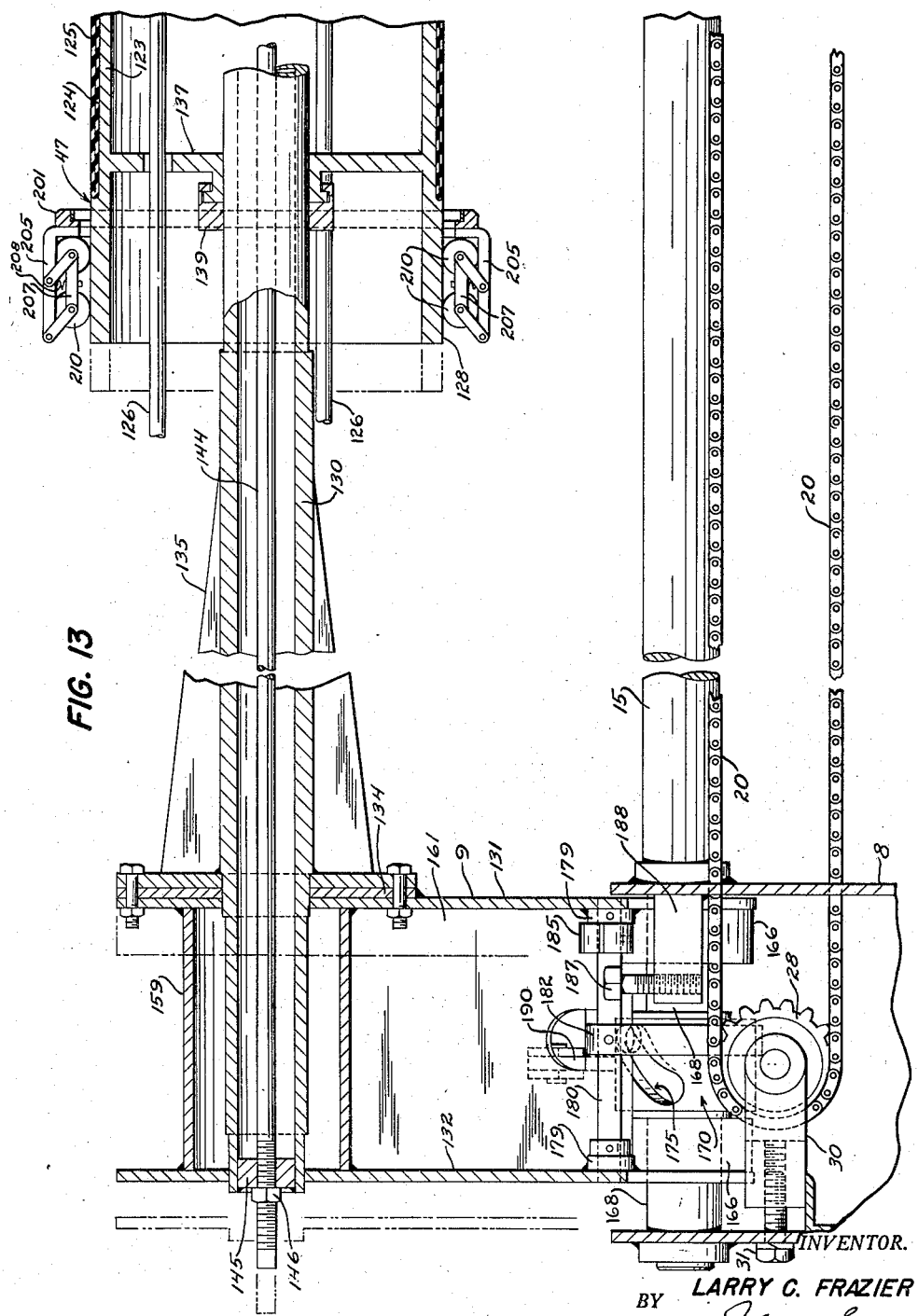
Fig. 13 is a vertical longitudinal section through the machine at the tail-stock.

In the extreme inner end of the tubular shaft 130 is slidably received a block 140 formed with a threaded socket in which is screwed the inner end of a long rod 144 (see Fig. 9). Rod 144 extends to a point beyond the outer wall 132 of the tail-stock where it is threaded into a nut 145 set in the end of the tubular shaft as shown in Fig. 13. A lock nut 146 holds the rod 144 in its adjusted position. By turning the rod 144, the outer end of which is formed with a squared surface, the rod 144 may be advanced or retracted. This is the means by which the movement of the drum 47 toward the building drum is arrested to compensate for any increase in the width of the building drum.

In the block 140 is secured by a bolt 148 a sleeve 149 supporting a ball bearing 150. Rotatable in the end of the shaft is an abutment collar 152 having a conical surface 153 adapted to mate with the conical surface in the ring 63 set in the end of the sleeve 58. Tail pieces or keys 154, in the collar 152, are received in slots 155 in the base of the web 136.

As shown in Fig. 9, the drum 45 is in its narrowest adjustment. If the drum is adjusted as shown in Fig. 10, the block 140 will be withdrawn by the rod 144 to a sufficient extent to compensate for the adjustment of shoes 100, so that the shiftable drum 47 will make contact with the edge of the main drum when it is moved to its innermost position. The abutment collar 152 with the splined connection 108 between the drum 46 and the sleeve 58 serves to insure that, if the drum assembly is to be rotated to stagger the splices in the tire, all three drum sections will rotate in unison.

THE TAIL STOCK

In order to remove the finished tire from the drum and also to insert the beads in the bead placing rings, the drum 47 is shifted to expose the left side of the main drum. While this might be a straight line movement, it is preferable to swing the shiftable drum out of alignment with the main drum. This is done by mounting the drum 47 on the pivoted tail-stock. However, in addition to the swinging movement the drum 47 must first be moved axially to clear the drum 45 before the swinging movement can occur. The tail-stock which carries the drum 47 is designed so that the axial movement and the swinging movement will be done by fluid operated mechanism actuated by the operator.

Figure 17:
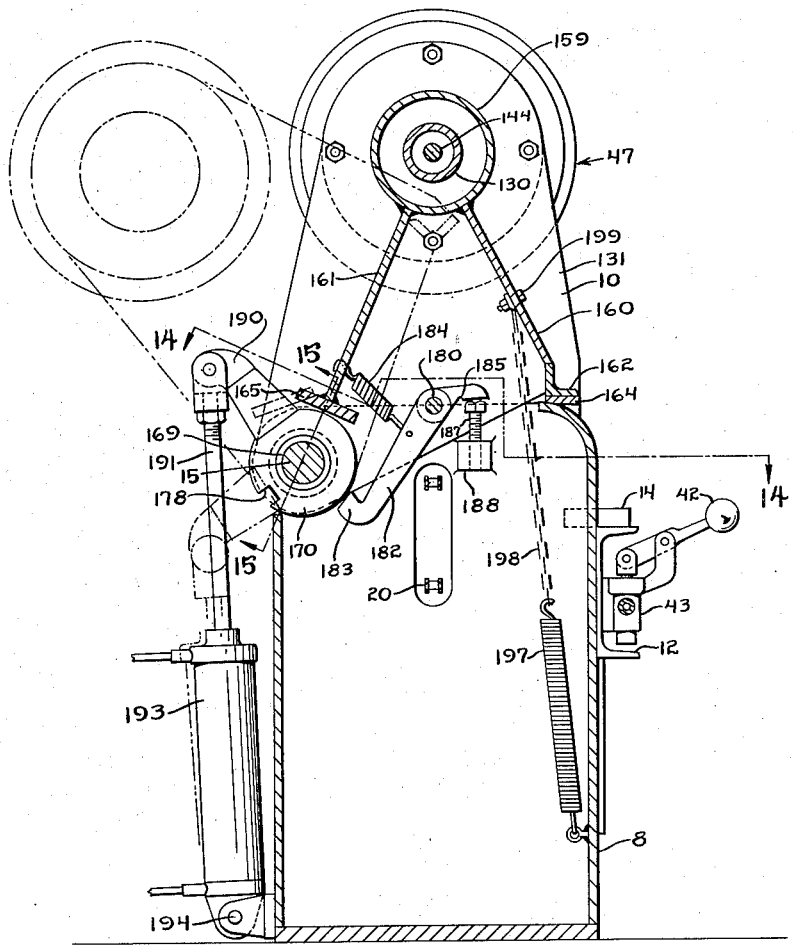
Fig. 17 is a vertical section through the left hand end of the machine on the line 17—17 of Fig. 1.

The tail-stock 10, which carries the shiftable auxiliary drum 47, is a substantially A-shaped element formed of the side walls 131 and 132 of the configuration shown in Fig. 17, held and braced by a circular housing 159 surrounding the outer end of shaft 130 and by front and rear inclined webs 160 and 161, respectively. The front web is provided with a foot-piece 162 which rests upon and slides over a supporting plate 164 carried by the upper front edge of the stanchion 8. The web 161 is welded along its lower edge to a cross-plate 165 which is held by two spaced end blocks 166 which are welded to the plate 165 and to the walls 131 and 132, respectively.

The shaft 15 is reduced at its left hand end where it passes through the walls of the lower stanchion 8 and over the reduced portion of the shaft are fitted the two oppositely faced flanged bearing sleeves 168 (Fig. 15). Between the opposed flanged ends of the sleeves 168 and mounted on a journal sleeve 169 is the rotatable cam 170 which moves the tail-stock toward and from the main drum. The blocks 166 are movable over the sleeves 168 as the tail-stock moves toward and from the central drum and also rock about the sleeves as the tail-stock swings to and from the full line and dotted line positions shown in Fig. 17.

A headed bolt 172 is fixed at a midway point on the plate 165 and carries a cam-roller 174 which fits within a curved cam track 175 cut in the face of the cam 170 (see Fig. 13). The configuration of the track 175 is such as to shift the tail-stock along the plate 164 within the limits afforded by the blocks 166.

At another point on the cam 170 is an open notch 178, the walls of which are abrupt as shown in Fig. 16. Across the plates 131—132 and rotatable in bearings 179 is a horizontal shaft 180 and fixed on this shaft, in the plane of the cam 170, is a lever arm 182 having an upturned hook-shaped extremity 183 adapted to ride on the surface of the cam and to interlock with the notch 178. A tension spring 184 from the lever arm 182 to the web 161 holds the hooked end of the lever against the surface of the cam and causes the two to interlock when the notch 178 reaches the hook 183. (See Fig. 17a.)

Also fixed to the shaft 180, but spaced therefrom as shown in Fig. 14, is a short arm 185, the purpose of which is to withdraw the hook 183 from the notch 178 when the tail-stock comes to its vertical position with the foot 162 resting on the rail 164. To actuate the shaft 180 for lifting the hook out of the notch an adjustable set screw 187 is located in a bracket 188 extending inwardly from a wall of the stanchion 8. In the position of the parts shown in Fig. 14, the arm 185 is out of register with the set screw 187 because in this view the tail-stock has been moved to its inner limit with the drums 47 and 45 in contact. However, when the tail-stock is shifted to the left to separate the drums 47 and 45, the arm 185 will be over the set screw.

The longitudinal movement of the tail-stock, as well as its swinging movement is done by rotating the cam 170. For this purpose an arm 190 is welded to a flattened area on the cam 170 and to this arm is pivoted the adjustable link 191 which is connected to a piston movable in a cylinder 193 pivoted to a bracket 194 at the base of the stanchion. The movement of the piston is controlled by a valve 195 mounted on the front of the stanchion 8 and operated by the hand lever 196. To assist in returning the tail-stock to its upright position, a coil spring 197 is anchored at its lowered end inside the stanchion 8, the upper end of the spring being connected by chain 198 to a stud 199 carried on the front wall 160 of the tail-stock.

Figure 17A:
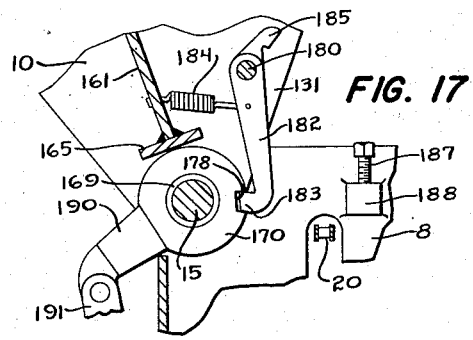
Fig. 17a is a view showing the position of certain elements when the tail-stock is tilted backwardly.
Figure 26:
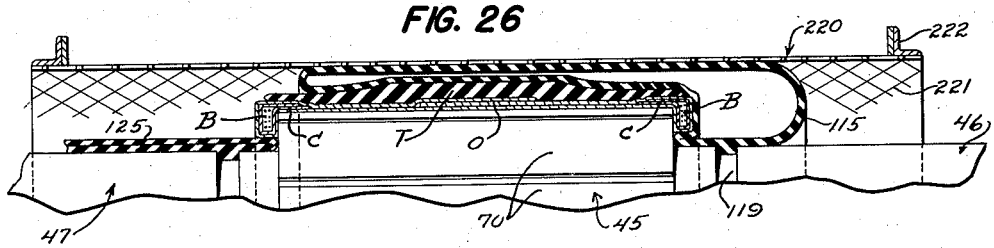
Fig. 26 is a view showing the first operation of pressing the tread onto the carcass, the second operation being the same except in the opposite direction.
Figure 27:
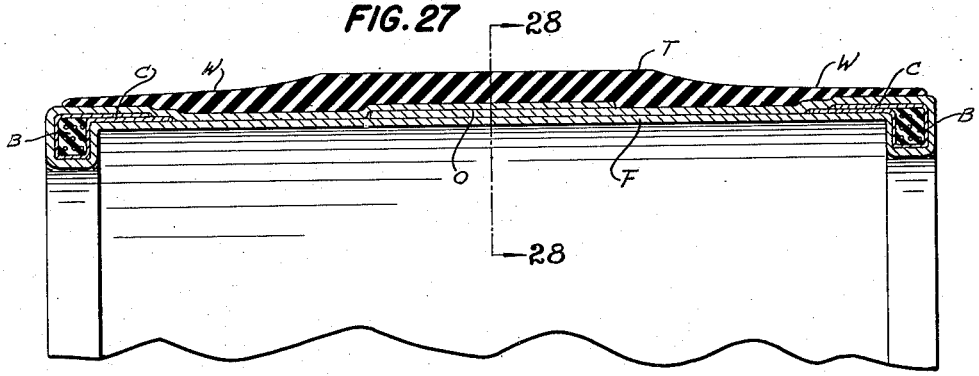
Fig. 27 is a view of the complete, uncured tire band ready for the shaping and vulcanizing operations.

In the position of the parts shown in full lines in Figs. 13 to 17, inclusive, the tail-stock is upright and at its extreme right hand position with the drums 47 and 45 in contact. At this time the hook 183 is riding on the surface of the cam 170. A tire having been completed, the operator moves the valve 195 to admit air under pressure to the top of the piston in the cylinder 193. This draws the link 191 downwardly to the dotted line position shown in Fig. 17, rotating the cam 170, which, through the roller 174 and slot 175, moves the tail-stock to the left, as shown by the arrow and dotted lines in Fig. 15, separating the drums. When the tail-stock reaches its outward limit of movement, the notch 178 is brought into register with the hook 183, which now interlocks with the cam, and continued rotation of the cam swings the tail-stock to the rear. Fig. 17a shows the position of the elements at the time when the tail-stock is in its tilted position. It will be noted that as soon as the hook interlocks with the cam rearward longitudinal movement of the tail-stock ceases because the cam and tail-stock thereafter move in unison. At the same time the arm 185 has moved over the set screw 187.

To restore the tail-stock to upright position and to bring the drums into contact, the valve 195 is reversed, which raises the link 191, the first movement being to bring the tail-stock back to upright position, at which time the arm 185 strikes the set screw 187 and releases the hook 183. Continued rotation of the cam now advances the tail-stock to bring the drums in contact.

It will be noted that the travel of the tail-stock is sufficient to move the drums into contact when the central drum is set at its minimum width as shown in Fig. 9. If the drum is widened as shown in Fig. 10, the abutment 152, which has been adjusted outwardly to compensate for the widening of the drum, will arrest the movement of the tail-stock, the pressure within the cylinder being insufficient to overcome the resistance offered by the abutment as it nests in the collar 63.

THE BEAD PLACING RINGS

The bead placing rings on either side of the machine are the same except as facing right and left. Description of the right-hand ring will be sufficient and particular reference is made to Figs. 6 and 7, although the rings show in other views. The right-hand ring 200 is located upon the extension 122 of the drum 46 beyond the bag 115 and the left-hand ring 201 is located on the extension 128 of the drum 47.

Referring to Fig. 7, the bead placing ring is provided with an undercut, angular recess 203 into which the bead is fitted, a shim plate 204 being inserted on its inner face to provide a close fitting seat for the bead. Ring 200 (or 201) is fixed to a series of arms 205, preferably four in number, which extend rearwardly from the ring and to each of which is articulated the parallelogram linkage 207 pressed inwardly by springs 208. On each parallelogram are mounted two rollers 210 which ride over the extension on the drum or the top surface of the bag.

On the end of the drum and staggered with respect to the arms 205 and fastened by screws 211 are lugs 212, the faces of which form stops for the outward movement of the bead placing rings. These studs are provided with spring clips 214 which releasably hold the rings at their position of rest.

The beads are placed in the rings 200 and 201 while the tail-stock is in tilted position. After the drum is expanded to its intermediate position, shown in Fig. 19, the bead placing rings are moved over the auxiliary drums to set the beads in position as shown in that view. The rings are then returned to idle positions.

THE CAGE AND ITS CARRIAGE

The cage, as a whole, is given the reference numeral 220. It is a hollow cylinder of sufficient internal diameter to encompass the drum assembly with a substantial clearance to allow the bags to function. As shown, the body of the cage is a metal shell 221 made of reticulated structure for lightness and also to afford a firm grip on the fabric and upon the bags. The ends of the shell are welded to angle irons 222 and are set within two parallel, vertical plates 224, which are in turn connected to angle irons 225 attached to the carriage 11 by bolts 226. The cage may be replaced to adapt the machine for different sizes of drums used in the manufacture of tires of different bead diameter.

The carriage 11 is a long triangular frame having a top plate 228 to which the cage is secured, a front plate 229, and end plates 230. A sleeve 232 is located on the rear of the carriage and slides over the shaft 15. The frame is supported at the front by pairs of upper and lower rollers 233 which ride above and below the track 14. The upper run of the chain 20 passes through apertures 235 in the plates 230 and the carriage is anchored to the upper run of the chain by a bolt 236 set in a plate 237 welded to the sleeve 232 (Fig. 5).

Attached to and depending from the lower edge of the front plate 229 is a striker plate 240, the front and rear sides of which are beveled, as shown in Fig. 1, to actuate the several limit switches which arrest the movement of the carriage in its several positions.

Each limit switch is connected to the circuit to the motor 16 which drives the chain 20 and is contained in a box 241 carried by a bracket 242 depending from the channel 12. Projecting upwardly from the box is an actuating arm 244 having a roller 245 located in the path of the striker plate 240. Each arm 244 of a switch 241 is of spring-loaded, jack-knife construction. The switch is operated in both directions of movement but the contacts of the switch are arranged so in the electrical setup that it will be effective only when in the proper sequence.

Reading from right to left, the several stop switches are designated as 241A to E, inclusive. The switch 241A stops the motor when the carriage 11 has reached the limit of its travel to the right and holds the cage in the position shown in Figs. 1 and 5. The switch 241B stops the motor when the carriage has reached the position shown in Fig. 21 with the cage over the stationary auxiliary drum 46. When the bag 115 has reached the desired pressure, the carriage resumes its travel to the left and the switch 241C stops the motor when the carriage has reached the position shown in Fig. 22 with the cage over the main tire building drum 45. On its continued movement to the left, after the bag 115 has freed itself from the cage, the striker 240 idly passes over the switch 241D and actuates the switch 241E to stop the carriage with the cage around the left hand drum 47 in the position shown in Fig. 23.

When the bag 125 has inflated to the required pressure, the carriage starts on its return movement to the right and the striker plate actuates the switch 241D, arresting the carriage with the cage about the tire building drum 45 in the position shown in Fig. 24. When the bag 125 has released itself from the cage, the carriage resumes its movement toward the right, the striker plate passing idly over switches 241C and 241B, until it reaches the switch 241A which arrests the carriage at the end of the cycle.

The direction in which the arms 244 of the several switches operate to arrest the motor and bring the carriage to a stop is indicated by the full-line arrows in Fig. 1, the dotted-line arrows showing the direction in which the several arms move idly.

The valves to the several air lines supplying air to the two bags 115 and 125 are indicated by the letters V and V', respectively, and are operated by solenoid valves as shown in Fig. 31. The solenoids controlling the air valves are actuated by the electrical circuit at the various points of carriage travel. When the solenoid is operated, calling for inflation of one of the bags, the valve is opened to the air line and the vent is closed. The air pressure is regulated by a regular reducing pressure regulated valve. When the pressure reaches the required degree in the bag 115, a mercury switch I, which is tilted in response to the pressure in the bag 115, closes a contact 279, which sets the mechanism to advance the cage over the drums for the first ply turning or tread pressing operation. At this point the limit switch operates the solenoid, which closes the air line feed, and opens the vent, allowing the pressure in bag 115 to be relieved. When the pressure in the bag 115 is relieved and the cage is ready to resume its movement to the left, the switch I tilts in the other direction, closing the switch 286. Similarly, when the pressure in bag 125 reaches its high, the switch II is tilted, closing the contact 294, to move the cage to the right for the second ply turning or tread pressing operation. When the pressure in bag 125 is released, the switch II tilts in the opposite direction making contact at 308 and the cage resumes its movement to the right.

THE WIRING DIAGRAM

As stated in the fore part of this specification, the movements of the carriage and the inflation and release of the bags are all automatically controlled and, except in case of accident, the operator has nothing to do but press a button, and the whole procedure is accomplished in about a half minute or less.

The main circuit breaker switch 251 is mounted on the main control board on the back of the machine. This circuit breaker switch, when closed, makes power available to main motor control switch (contacts 271, 296, 272, 297, 273, 298) for motor 16 and brake 252. When switch 251 is closed the relay 256 is energized, which closes normally open contacts 257 and 258, thus setting up proper circuits for initiating operating cycle provided machine is in initial or extreme right position.

The control push button station 259 is shown in a convenient location in Fig. 1. It has two buttons 260 and 310. Button 310 serves to stop the operation of the cycle manually anywhere desired. Button 260 serves to start the cycle at the beginning or to restart anywhere in the cycle after a manual stop.

The button 260 is the starter button which the operator presses after a ply or a tread is laid over the drum and the machine is ready to complete the operation of turning the ply or pressing the tread on the carcass. Pressing the button 260 energizes the relay 261, which closes the normally open contacts 262 and 263. The relay 261 is electrically interlocked through contacts 257 and 262 and the relay 264 is now energized through the contact 263 which closes the contacts 265 and 266. This energizes the contactor 267 through the contacts 268, 269, and 270; 267 closes the contacts 271, 272, and 273, releases brake 252 and starts the motor 16 in forward, moving the carriage 11 to the left.

Movement of the carriage to the left releases the limit switch 241A which opens the switch 274 and allows the relay 256 to open the contacts 257 and 258, and releases the relay 261. Release of relay 256 closes the contact 275 and interlocks the relay 264.

The cage, through the continued forward movement of the motor 16, moves to the position of Fig. 21, where the switch 241B is actuated, closing the contact 276 and opening the contact 269, thus opening the circuit to the contactor 267, and the motor stops, and the brake is applied.

The closing of contact 276 energizes the solenoid valve 277 which opens valve V in the pressure line leading to the bag 115. When the mercury switch I is tilted by the pressure in bag 115, to the pressure set point, it closes contact 279, which reestablishes the line to the contactor 267.

The motor now starts up in forward, brake 252 is released, and the carriage resumes its movement to the left until the switch 241C is contacted, which closes the contact 280. Closing of the contact 280 energizes a latch relay 281 to closed position and this opens the latch relay contacts 282 and 270 and closes the contacts 283 and 284. Opening of the contact 270 stops the motor, applies brake, and arrests the movement of the cage in the position shown in Fig. 22. Closing of the contact 280 energizes the solenoid valve 285 to operate the valve V in the pressure line, which releases the air from the bag 115. As soon as the pressure in bag 115 reaches its low limit, the bag snaps back in place over the drum 46. Lowering of the pressure actuates the mercury switch I which, in turn, closes the switch 286 and reenergizes the contactor 267 through the closed contact 283 which has just been set by the latched relay operations and the motor resumes its forward movement and the carriage now travels to its extreme left hand position.

At the extreme left the switch 241E is operated, which closes the contact 288 which energizes the relay 289 through the contact 287 which closes the contacts 290 and 291, and opens the contacts 268 and 287. Opening of contact 268 releases the contactor 267 stopping the carriage in the position shown in Fig. 23. Closing of the contact 288 also energizes solenoid valve 292, opening valve V' and admitting air to the left hand bag 125.

As soon as the pressure in bag 125 reaches its desired degree, the mercury switch II closes the contact 294, energizing the contactor 295 which is the reverse contactor whereas contactor 267 was the forward contactor. Energizing of contactor 295 closes the contacts 296, 297 and 298, which reverses the direction of the motor and the carriage starts on its return movement. This movement continues until the switch 241D is actuated by the striker plate 240, which closes the contact 300, energizing the relay 301 to closed position. Operation of relay 301 opens relay contacts 302 and 303 and closes the contacts 304 and 305. Opening of the relay contact 303 releases the relay 295 and stops the carriage in the position shown in Fig. 24.

Closing of the contact 300 energizes the solenoid valve 307, operating the valve V' to release the air from the bag 125. As soon as the pressure is relieved the mercury switch II closes the contact 308 which reenergizes the contactor 295 through the contact 304, which has just been reset in the last relay operation.

The carriage then moves to the extreme right where it actuates the switch 241A and this closes the limit switch 274. Closing of switch 274 energizes the relay 256, which in turn opens the interlock contact 275, thereby opening relay 264. This in turn opens the contact 266 which opens the main control circuit through the contactor 295 and stops the carriage in its initial position.

Closing of relay 256 also closes contact 258 which energizes the latch relays 310, 311 and 312. This results in setting up the circuit for the next cycle, all latch relay contacts being operated at this time.

It will be noted that the mercury switch I for the right hand bag closes the contact 286 at the low pressure limit and closes the contact 279 at the high pressure limit. The mercury switch II for the left hand bag closes the contact 308 at the low pressure limit and closes the contact 294 at the high pressure limit. It will also be noted that the solenoid valve 277 inflates the bag 115 while the solenoid valve 285 deflates it. The solenoid valve 292 inflates the bag 125 while the solenoid valve 307 deflates it.

The stop button 310 will, when opened, shut off the motor and bring the carriage to an immediate stop without requiring the operation of the circuit breaker 251 and without disturbing the setting at any time. The button 310 is used only in the case of an emergency.

It will also be noted from the description which has been given that when the cage is put in motion by closing the circuit at button 260, the carriage is first stopped by reaching the switch 241B. It resumes its motion to the left when the bag 115 is inflated to the desired degree, whereupon the switch I closes the circuit and starts up the motor in forward. The carriage is then stopped by the switch 241C and the bag 115 is deflated. As soon as the pressure drops to the required amount, the switch I again starts the motor in forward and it continues this movement until arrested by the limit switch 241E. The circuits to the motor are now reversed and the bag 125 is inflated, switch II comes into play and the return movement of the carriage to the right is started when the pressure in bag 125 reaches its desired point. Again the carriage is stopped by switch 241D, the bag is deflated, and the carriage moves back to limit switch 241A and the circuits are now reset for the next operation.

The movement of the cage over the drum 45 while the respective bags are at their required pressures folds the plies over the beads in the manner described. For the tread applying operation, the cage is moved in the same manner, the bags pressing the tread against the carcass.

The tire building operations are thus carried on entirely automatically, the only manual operations required being the application of the ply (or tread) to the drum, the setting of the beads, and the removal of the finished tire. The actuation of the tail-stock, both in setting up the drum and in preparation for the removal of the finished tire, is accomplished by the operation of the valve control lever 196.

It is preferred that the cage movements be entirely automatically controlled and by an electrical system similar to or the equivalent of that shown and described, but other mechanisms for accomplishing the purposes may be used.

What is claimed is:

1. In an apparatus for building tires, the combination of a drum assembly comprising a central tire building drum and two auxiliary drums at the sides of the central drum, a hollow cage movable over the drum assembly in telescoping relation thereto, a tube on each auxiliary drum, said tubes being inflatable to expand them against the inner surface of the cage, means to move the cage over the drum assembly, means to arrest the cage when it is in register with each of said drums, and means responsive to the degrees of pressures in the bags to cause said cage to resume its travel.

2. In an apparatus for building tires, the combination of a drum assembly comprising a central tire building drum and two auxiliary drums at the sides of the central drum, a hollow cage movable over the drum assembly in telescoping relation thereto, a tube on each auxiliary drum, said tubes being inflatable to expand them against the inner surface of the cage, means to move the cage over the drum assembly, means to arrest the cage when it is in register with each of said drums, inflating connections for the tubes operable when the cage is over an auxiliary drum, and means responsive to the degrees of pressures in the bags to cause said cage to resume its travel.

3. In an apparatus for building tires, the combination of a drum assembly comprising a central tire building drum and two auxiliary drums at the sides of the central drum, a hollow cage movable over the drum assembly in telescoping relation thereto, a tube on each auxiliary drum, said tubes being inflatable to expand them against the inner surface of the cage, means to move the cage over the drum assembly, means to arrest the cage when it is in register with each of said drums, inflating connections for the tubes operable when the cage is over an auxiliary drum, deflating connections for the tubes operable when the cage is over the central drum, and means responsive to the degrees of pressures in the bags to cause said cage to resume its travel.

4. An apparatus for building tires having a drum assembly comprising a central tire building drum and two auxiliary drums at the sides of the central drum, a hollow cage movable over the drum assembly and in telescoping relation thereto, a tube on each auxiliary drum, said tubes being inflatable to expand them against the inner surface of the cage, means to move the cage over the drum assembly and arrest it when in register with each of said drums, means to expand each tube when the cage is in register with its auxiliary drum, means to cause the cage to move over the tire building drum while a tube is expanded, and means to deflate each tube while it is in register with the central drum.

5. An apparatus for building tires having a drum assembly comprising a central tire building drum and two auxiliary drums at the sides of the central drum, a hollow cage movable over the drum assembly and in telescoping relation thereto, a tube on each auxiliary drum, said tubes being inflatable to expand them against the inner surface of the cage, means to move the cage over the drum assembly and arrest it when in register with each of said drums, means to expand each tube when the cage is in register with its auxiliary drum, means controlled by the desired maximum degree of inflation of each tube to cause the cage to move over the tire building drum while a tube is expanded, and means to deflate each tube while it is in register with the central drum.

6. An apparatus for building tires having a drum assembly comprising a central tire building drum and two auxiliary drums at the sides of the central drum, a hollow cage movable over the drum assembly and in telescoping relation thereto, a tube on each auxiliary drum, said tubes being inflatable to expand them against the inner surface of the cage, means to move the cage over the drum assembly and arrest it when in register with each of said drums, means to expand each tube when the cage is in register with its auxiliary drum, means controlled by the desired maximum degree of inflation of each tube to cause the cage to move over the tire building drum while a tube is expanded, means to deflate each tube while it is in register with the central drum, and mechanism operated when each said tube has deflated to cause the cage to resume its movement.

7. In a tire building machine, a drum assembly comprising a tire building drum and an auxiliary drum at the side of the building drum, a hollow cage, a propelling means to move the cage from one side of the drum along the drum, means to arrest the propelling means when the cage is in register with each drum, an inflatable tube on the auxiliary drum, and means controlled by the degree of inflation of the tube to set the propelling means in motion.

8. In a tire building machine, a drum assembly comprising a tire building drum and an auxiliary drum at the side of the building drum, a hollow cage, a propelling means to move the cage from one side of the drum along the drum, means to arrest the propelling means when the cage is in register with each drum, an inflatable tube on the auxiliary drum, means actuated when the inflation of the tube reaches a predetermined maximum to set the propelling means in motion to move the cage from registering position with the auxiliary drum to registering position with the building drum, and means actuated upon deflation of the tube to shift the cage out of register with the building drum.

9. In a tire building machine, a drum assembly comprising a central tire building drum and auxiliary drums at the sides of the central drum, a hollow cage, a reversible propelling means to move the cage over the drum assembly, means to arrest the propelling means when the cage is in register with each drum, inflatable tubes on the auxiliary drums, and means actuated when the inflation of the tubes reaches a predetermined maximum to set the propelling means in motion to shift the cage from position in register with the auxiliary drums to position in register with the central drum.

10. In a tire building machine, a drum assembly comprising a central tire building drum and auxiliary drums at the sides of the central drum, a hollow cage, a reversible propelling means to move the cage over the drum assembly, means to arrest the propelling means when the cage is in register with each drum, inflatable tubes on the auxiliary drums, and means actuated when the inflation of the tubes reaches a predetermined maximum to set the propelling means in motion to shift the cage from position in register with the auxiliary drums to position in register with the central drum, said means being also actuated when the tubes are deflated to shift the cage out of register with the central drum.

11. In a tire building machine, a drum assembly comprising a central tire building drum and auxiliary drums at the sides of the central drum, a hollow cage, a reversible propelling means connected to the cage, means to arrest the movement of the cage in four positions, (a) at rest at one side of the drum assembly, (b) over one of the auxiliary drums, (c) over the central drum, and (d) over the second auxiliary drum, inflatable tubes on the auxiliary drums, and means controlled by the pressure within the tubes to move the position of the cage in the following order, from b to c, c to d, d to c, and c to a.

12. In a tire building machine, a drum assembly comprising a central tire building drum and auxiliary drums at the sides of the central drum, a hollow cage, a reversible propelling means connected to the cage, means to arrest the movement of the cage in four positions, (a) at rest at one side of the drum assembly, (b) over one of the auxiliary drums, (c) over the central drum, and (d) over the second auxiliary drum, inflatable tubes on the auxiliary drums, and means actuated when the inflation of the tubes reaches a predetermined maximum to shift the cage from b to c and d to c positions and when the tubes are deflated to shift the cage from c to d and from c to a positions.

13. In a tire building machine, a drum assembly comprising a central tire building drum and auxiliary drums at the sides of the central drum, means to expand the central drum to form shoulders adjacent the inner ends of the auxiliary drums, said drum assembly being adapted to receive tire fabric the edges of which overlap the auxiliary drums, and bead placing rings movable along the auxiliary drums to place beads against fabric lying over the shoulders.

14. In a tire building machine, a drum assembly comprising a central tire building drum and auxiliary drums at the sides of the central drum, means to expand the central drum to form shoulders adjacent the inner ends of the auxiliary drums, an inflatable tube on each auxiliary drum, said central drum being adapted to receive a ply of tire fabric the edges of which overlap the tubes, bead placing rings movable along the auxiliary drums to place beads against the shoulders, and means to expand the tubes and to bring the tubes while in expanded condition over the central drum.

15. In a tire building machine, a drum assembly comprising a central tire building drum and auxiliary drums at the sides of the central drum, means to expand the central drum to form shoulders adjacent the inner ends of the auxiliary drums, an inflatable tube on each auxiliary drum, said central drum being adapted to receive a ply of tire fabric the edges of which overlap the tubes, bead placing rings movable along the auxiliary drums to place beads against the shoulders, means to expand the tubes, and means to turn the tubes over the central drum while the tubes are in expanded condition, said last named means comprising a hollow cage movable telescopically over the drum assembly.

16. In a tire building machine, a drum assembly comprising a central tire building drum and auxiliary drums at the sides of the central drum, means to expand the central drum to form shoulders adjacent the inner ends of the auxiliary drums, an inflatable tube on each auxiliary drum, said central drum being adapted to receive a ply of tire fabric the edges of which overlap the tubes, bead placing rings movable along the auxiliary drums to place beads against the shoulders, means to expand the tubes, and means to turn the tubes successively over the central drum while the tubes are in expanded condition, said last named means comprising a hollow cage to encompass the tubes, and a reversible propelling means to shift the cage into register with the central drum from opposite sides thereof.

17. In a tire building machine, a drum assembly comprising an expansible central tire building drum, auxiliary drums on either side thereof, a flat inflatable tube over each auxiliary drum, the outer surface of the tubes when deflated coinciding with the perimeter of the central drum when in retracted position, means to expand the drum to an intermediate position and thereafter to a fully expanded position, and bead placing rings movable along the auxiliary drums to place beads against fabric lying over the edges of the central drum when it is in intermediate position.

18. In a tire building machine, a drum assembly comprising an expansible central tire building drum, auxiliary drums on either side thereof, a flat inflatable tube over each auxiliary drum, the outer surface of the tubes when deflated coinciding with the perimeter of the central drum when in retracted position, means to expand the drum to an intermediate position and thereafter to a fully expanded position, bead placing rings movable along the auxiliary drums to place beads against fabric lying over the edges of the central drum when it is in intermediate position, a cage movable telescopically over the drum assembly, and means to inflate the tubes when the cage surrounds the auxiliary drums.

19. In a tire building machine, a drum assembly comprising an expansible central tire building drum, auxiliary drums on either side thereof, a flat inflatable tube over each auxiliary drum, the outer surface of the tubes when deflated coinciding with the perimeter of the central drum when in retracted position, means to expand the drum to an intermediate position and thereafter to a fully expanded position, bead placing rings movable along the auxiliary drums to place beads against fabric lying over the edges of the central drum when it is in intermediate position, a cage movable telescopically over the drum assembly, and means to inflate the tubes when the cage surrounds the auxiliary drums and to maintain each tube in inflated condition until the cage registers with the central drum and thereafter to deflate the tubes.

20. A tire building machine comprising a drum assembly having a central expansible section and auxiliary sections at the sides thereof, flat inflatable tubes surrounding the auxiliary sections, the outer surface of the tubes coinciding with the outer surface of the drum when in retracted condition, and means to expand the central section while all the sections are in axial alignment to form bead positioning shoulders at the sides of the central section.

21. A tire building machine comprising a drum assembly having a central expansible section and auxiliary sections at the sides thereof, flat inflatable tubes surrounding the auxiliary sections, the outer surface of the tubes coinciding with the outer surface of the drum when in retracted condition, and means to expand the central section while all the sections are in axial alignment to an intermediate position to form bead positioning shoulders at the sides of the central section and thereafter to expand the central section further.

22. A tire building machine comprising a drum assembly having a central expansible section and auxiliary sections at the sides thereof, flat inflatable tubes surrounding the auxiliary sections, the outer surface of the tubes coinciding with the outer surface of the drum when in retracted condition, endless bead placing rings movable over the outer surfaces of the tubes, and means to expand the central section while all the sections are in axial alignment to form bead positioning shoulders at the sides of the central section.

23. A tire building machine comprising a drum assembly having a central expansible section and auxiliary sections at the sides thereof, flat inflatable tubes surrounding the auxiliary sections, the outer surface of the tubes coinciding with the outer surface of the drum when in retracted condition, endless bead placing rings movable over the outer surfaces of the tubes, and means to expand the central section while all the sections are in axial alignment to an intermediate position to form bead positioning shoulders at the sides of the central section and thereafter to expand the central section further.

24. In a tire building machine, a stationary support at one side of the machine and a shiftable support at the other side of the machine, an expansible tire building drum and an auxiliary drum on said stationary support, a second auxiliary drum on the shiftable support and movable in alignment with the tire building drum, means for expanding the tire building drum while all of said drums are in alignment, and bead placing rings movable over the auxiliary drums and adapted to place bead rings against shoulders formed by the expansion of the tire building drum.

25. In a tire building machine, a support at one side of the machine, an expansible tire building drum and an auxiliary drum on the support, a second support at the other side of the machine, a second auxiliary drum on the second support, means for shifting one support with respect to the other support to permit removal of the tire from the tire building drum, and bead placing rings movable over the auxiliary drums and adapted to place bead rings against shoulders formed by the expansion of the tire building drum.

26. In a tire building machine, a support at one side of the machine, an expansible tire building drum having an intermediate degree of expansion and an auxiliary drum on the support, a second support at the other side of the machine, a second auxiliary drum on the second support, means for shifting one support with respect to the other support to permit removal of the tire from the tire building drum, and bead placing rings movable over the auxiliary drums and adapted to place bead rings against shoulders formed by the expansion of the tire building drum to its intermediate degree.

27. In a tire building machine, a drum assembly comprising a central tire building section and auxiliary sections at the sides thereof, inflatable tubes surrounding the auxiliary sections, a carriage movable along the drum assembly, a cage on the carriage movable telescopically over the drum assembly, a device to propel the carriage in one direction from a position at one side of the drum assembly over the complete drum assembly, means operative when the carriage reaches the end of the drum assembly to reverse the carriage propelling device and return the carriage to its original position at the side of the drum assembly, stops in the path of the carriage to arrest the carriage propelling device momentarily during outward movement of the carriage when the cage surrounds each section of the drum assembly, and means to inflate each tube while the cage is in register with its auxiliary drum and to maintain it in inflated condition while the cage moves into register with the central section.

28. In a tire building machine, a drum assembly comprising a central tire building section and auxiliary sections at the sides thereof, inflatable tubes surrounding the auxiliary sections, a carriage movable along the drum assembly, a cage on the carriage movable telescopically over the drum assembly, a device to propel the carriage in one direction from a position at one side of the drum assembly over the complete drum assembly, means operative when the carriage reaches the end of the drum assembly to reverse the carriage propelling device and return the carriage to its original position at the side of the drum assembly, stops in the path of the carriage to arrest the carriage propelling device momentarily during outward movement of the carriage when the cage surrounds each section of the drum assembly, means to inflate each tube while the cage is in register with its auxiliary drum and to maintain it in inflated condition while the cage moves into register with the central section, and means to deflate each tube while the cage is in register with the central section.

29. A machine in accordance with claim 27 in which each movement of the cage from register with an auxiliary section to register with the central section is initiated when the pressure within the tube on that auxiliary section reaches a predetermined maximum.

30. A machine in accordance with claim 28 in which the movements of the cage out of register with the central section are initiated when the pressures within the tubes reach a predetermined minimum.

31. In a tire building machine, a drum assembly comprising an expansible central tire building section and auxiliary sections at the sides thereof, inflatable tubes surrounding the auxiliary sections, means to shift the several sections into and out of alignment, means to expand the central section while the sections are in alignment, a bead placing ring movable over each auxiliary section, a carriage movable along the drum assembly, a cage on the carriage movable telescopically over the drum assembly, reversible means to propel the carriage from a position at one side of the drum assembly over the assembly and return it to its original position, means to arrest the propelling means momentarily while the cage surrounds each section of the drum assembly, and means to inflate each tube while the cage is in register with its auxiliary drum and to maintain it in inflated condition while the cage moves into register with the central section.

32. In a tire building machine, a drum assembly comprising an expansible central tire building section and auxiliary sections at the sides thereof, inflatable tubes surrounding the auxiliary sections, means to shift the several sections into and out of alignment, means to expand the central section while the sections are in alignment, a bead placing ring movable over each auxiliary section, a carriage movable along the drum assembly, a cage on the carriage movable telescopically over the drum assembly, reversible means to propel the carriage from a position at one side of the drum assembly over the assembly and return it to its original position, means to arrest the propelling means momentarily while the cage surrounds each section of the drum assembly, means to inflate each tube while the cage is in register with its auxiliary drum and to maintain it in inflated condition while the cage moves into register with the central section, and means to deflate each tube while the cage is in register with the central section.

33. A machine in accordance with claim 31 in which each movement of the cage from register with an auxiliary section to register with the central section is initiated when the pressure within the tube on that auxiliary section reaches a predetermined maximum.

34. A machine in accordance with claim 32 in which the movements of the cage out of register with the central section are initiated when the pressures within the tubes reach a predetermined minimum.

LARRY C. FRAZIER.

REFERENCES CITED

The following references are of record in the file of this patent:

UNITED STATES PATENTS

| Number    | Name      | Date          |
|-----------|-----------|---------------|
| 2,313,035 | Breth     | Mar. 9, 1943  |
| 2,394,464 | McChesney | Feb. 6, 1946  |
| 2,440,662 | Frazier   | Apr. 27, 1948 |